Jan. 17, 1956 M. M. LEVY 2,731,512

MULTICHANNEL COMMUNICATION SYSTEMS

Filed Oct. 17, 1950 13 Sheets-Sheet 1

INVENTOR
Maurice Moise Levy
BY [signature]
ATTORNEY

Jan. 17, 1956 M. M. LEVY 2,731,512
MULTICHANNEL COMMUNICATION SYSTEMS
Filed Oct. 17, 1950 13 Sheets-Sheet 2
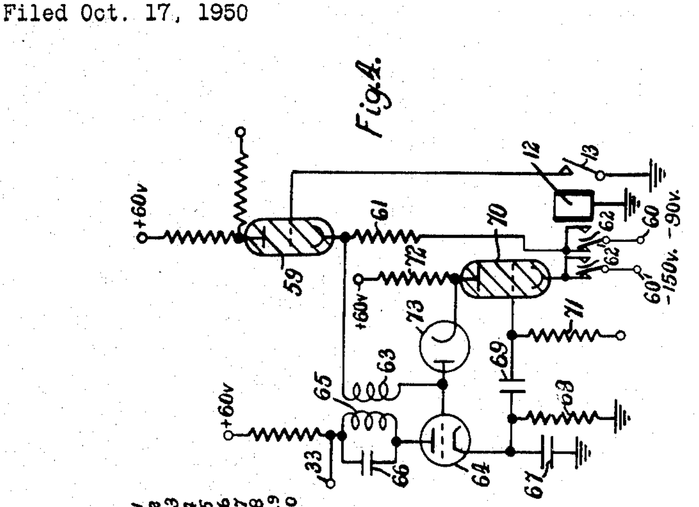
Fig. 8.
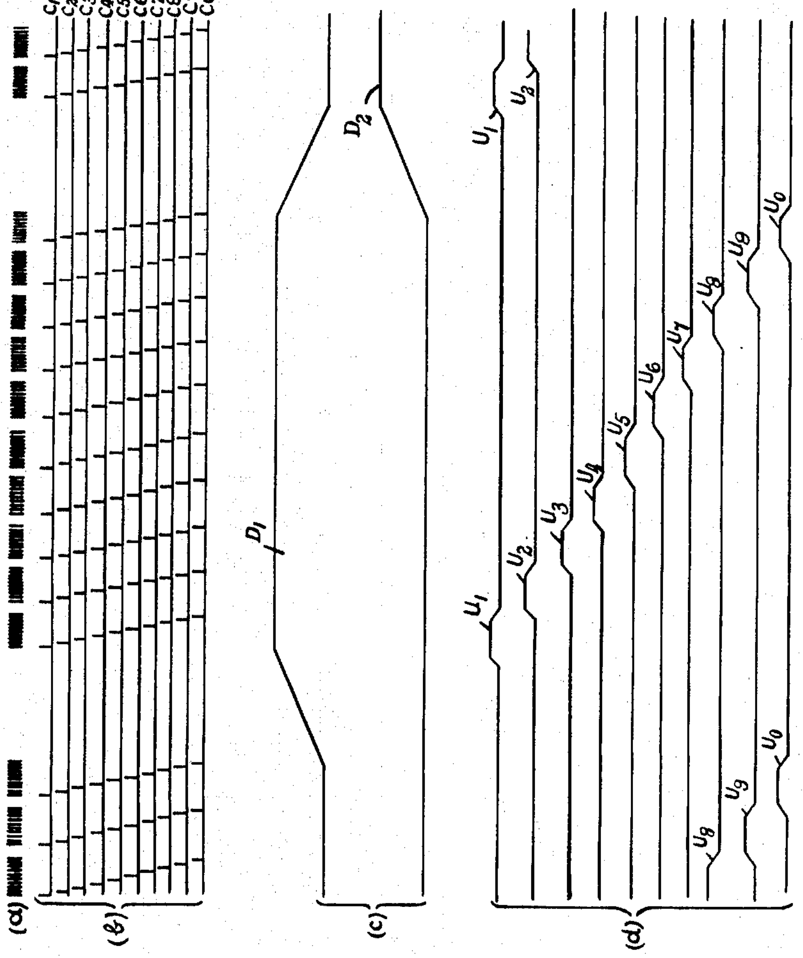
INVENTOR
MAURICE MOISE LEVY
BY [signature]
ATTORNEY INVENTOR
Maurice Moise Levy
BY [signature]
ATTORNEY Jan. 17, 1956 M. M. LEVY 2,731,512

MULTICHANNEL COMMUNICATION SYSTEMS

Filed Oct. 17, 1950 13 Sheets-Sheet 4

INVENTOR
Maurice Moise Levy
BY [signature]
ATTORNEY

INVENTOR
Maurice Moise Levy
BY [signature]
ATTORNEY

INVENTOR
MAURICE MOISE LEVY
BY [signature]
ATTORNEY

INVENTOR
Maurice Moise Levy
BY [signature]
ATTORNEY

INVENTOR
MAURICE MOISE LEVY
BY
ATTORNEY

Jan. 17, 1956 M. M. LEVY 2,731,512

MULTICHANNEL COMMUNICATION SYSTEMS

Filed Oct. 17, 1950 13 Sheets-Sheet 9

INVENTOR
Maurice Moise Levy
BY [signature]
ATTORNEY

INVENTOR
Maurice Moise Levy
BY [signature]
ATTORNEY

INVENTOR
MAURICE MOISE LEVY
BY [signature]
ATTORNEY

MULTICHANNEL COMMUNICATION SYSTEMS

Filed Oct. 17, 1950 13 Sheets-Sheet 12

INVENTOR
MAURICE MOISE LEVY
BY [signature]
ATTORNEY

Jan. 17, 1956 M. M. LEVY 2,731,512

MULTICHANNEL COMMUNICATION SYSTEMS

Filed Oct. 17, 1950 13 Sheets-Sheet 13

INVENTOR
MAURICE MOISE LEVY
BY [signature]
ATTORNEY

United States Patent Office 2,731,512
Patented Jan. 17, 1956

2,731,512

MULTICHANNEL COMMUNICATION SYSTEMS

Maurice Moise Levy, Ottawa, Ontario, Canada, assignor to The General Electric Company Limited, London, England Application October 17, 1950, Serial No. 190,532

Claims priority, application Great Britain October 26, 1949

14 Claims. (Cl. 179—18)

The present invention relates to multi-channel communication systems, particularly but not exclusively, telephone systems, in which two stations are connected by a plurality of channels. Each channel may be constituted, for example, by a landline circuit, or by a carrier oscillation, the several carrier oscillations being of different frequencies, or by a pulse train, the several pulse trains being interlaced with one another.

In a simple example of such a system the two stations are telephone exchanges serving different areas, the channels connecting the two stations enabling a subscriber on one of the exchanges to communicate with a subscriber on the other exchange. In another example one of the stations is a trunk switching centre and the other is one of a number of telephone exchanges connected to the trunk switching centre, or is a second trunk switching centre. In either case, when it is desired to establish communication between the two stations in the system, it is necessary first of all to identify a channel not already in use. In known arrangements it is usual to provide for this purpose a mechanical switch which hunts over a bank of contacts associated with the several channels respectively until a contact is found whose voltage condition indicates that its associated channel is not in use. An indication of the identity of the free channel is then automatically given, or a connection is automatically made to the free channel. Such mechanical switches are normally termed line finders.

When the number of channels is large, say of the order of a hundred or more, the line finder may take some considerable time to find a free channel.

It is one object of the present invention to provide improved apparatus for identifying a free channel in a multichannel communication system and capable of operating in a small fraction of the time taken by known mechanical line finders especially when the number of channels in the system is large.

A further object of the invention is to provide improved apparatus for automatically establishing a connection with a free channel in a multi-channel communication system.

According to the present invention apparatus for identifying a free channel or channels in a multi-channel communication system comprises means for generating a plurality of voltages of predetermined different characteristics each identified with one of the several channels respectively of the system and connections for applying all the generated voltages to an interrogating circuit, the interrogating circuit being responsive on engaged condition in any channel so as to suppress from the output terminal of the interrogating circuit the voltages whose characteristics are identified with each of the channels then engaged, or the voltages whose characteristics are identified with each of the channels then free. Thus the generated voltages appearing at the output terminals of the interrogating circuit are either those identified with free channels or those identified with engaged channels. The generated voltages may be interlaced pulse trains, each train being identified with one of the channels. In this case the aforesaid characteristic of each pulse train is the instants of occurrence of the pulses therein relatively to those of the pulses in the other trains. The generated voltages may be characterised in other ways, however, such as, for example, by frequency, amplitude, or waveform as, for instance, by coded pulses.

Further according to the invention, indicating or control apparatus is provided responsive to the output of the interrogating circuit to indicate one, and only one, of the identified free channels. This apparatus may be used to indicate the number of the identified channel to an operator or to control a switching operation. Where the generated voltages are interlaced pulse trains, it may be arranged that the indicating or control apparatus responds to the first pulse appearing at the output terminals of the interrogating circuit after the apparatus is put into use to identify a free channel. If this indicating or control circuit is used when the characteristics of the generated voltages are other than their instants of occurrence it is necessary to provide means for giving the output voltages from the interrogating circuit a time characteristic in addition to whatever other characteristic they may have. For example, the interrogating circuit may have an output terminal for each voltage, and these several output terminals may be connected to the several input terminals of a selector whose output terminal is switched progressively to the several input terminals.

According to a feature of the invention, the indicating or control apparatus comprises a lock circuit adapted to pass to a control circuit the first, and no other, of the channel-identifying voltages occurring after the apparatus is made operative, or a voltage having characteristics related to those of the first of the channel identifying voltages occurring after the apparatus is made operative, the control circuit comprising one or more groups of switch devices arranged in such a manner that only one switch device in each group becomes operated in response to the voltage passed from the lock circuit to the control circuit, different ones, or different combinations, of the switch devices being responsive to voltages of different characteristics in order to identify the channel number of the voltage passed to the control circuit from the lock circuit.

According to another feature of the invention, switch means are provided to establish a connection with the identified free channel substantially immediately upon the operation of the one, or combination, of the aforesaid switch devices operated to indicate the free channel, the operated switch device or devices providing a control voltage for controlling the said switch means.

The invention will now be described by way of example with reference to the accompanying drawings, in which Figure 1 is a block schematic diagram of a part of a telephone exchange embodying apparatus according to the invention, Figures 2 and 3 are circuit diagrams of switch devices suitable for use in a control circuit shown in block form in Figure 1.

Figure 4 is a circuit diagram of a lock circuit suitable for use in the arrangement of Figure 1.

Figure 7:
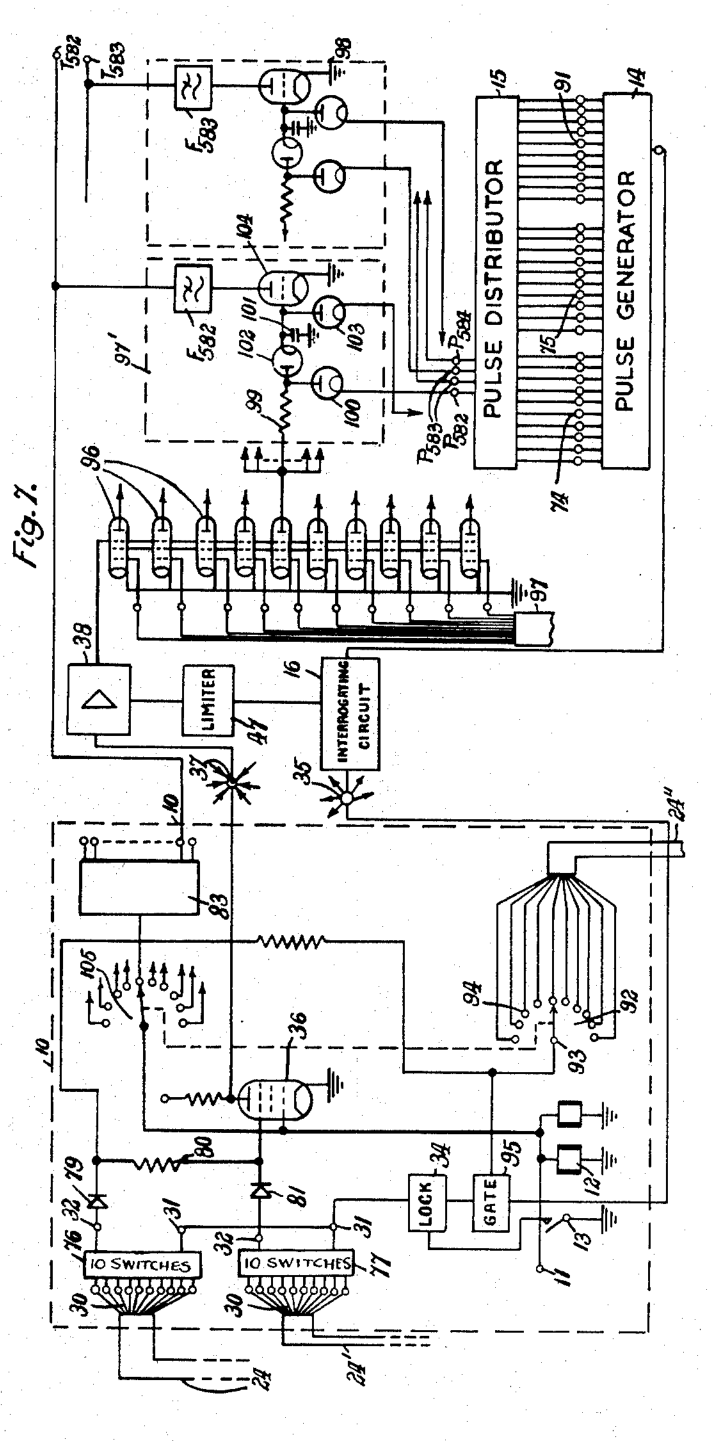
Figures 9, 10, 13:
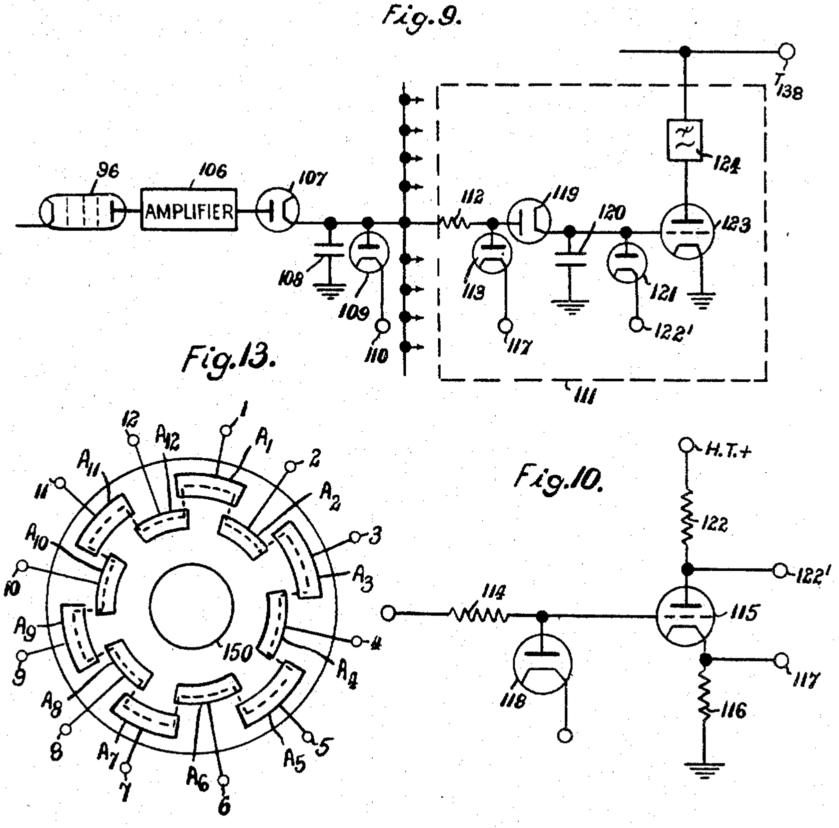
Figure 11:
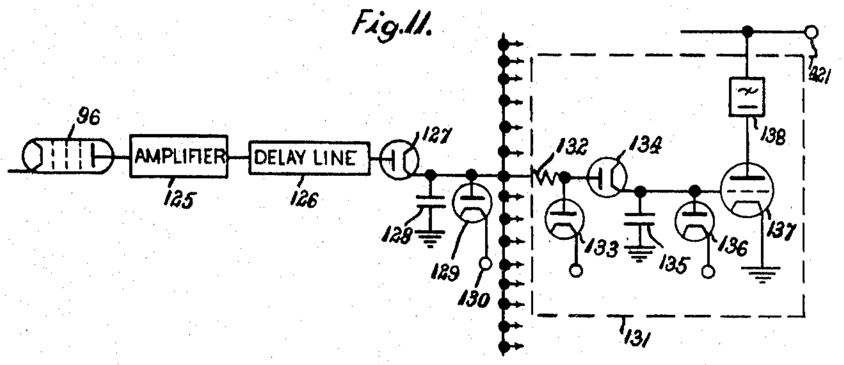
Figure 12:
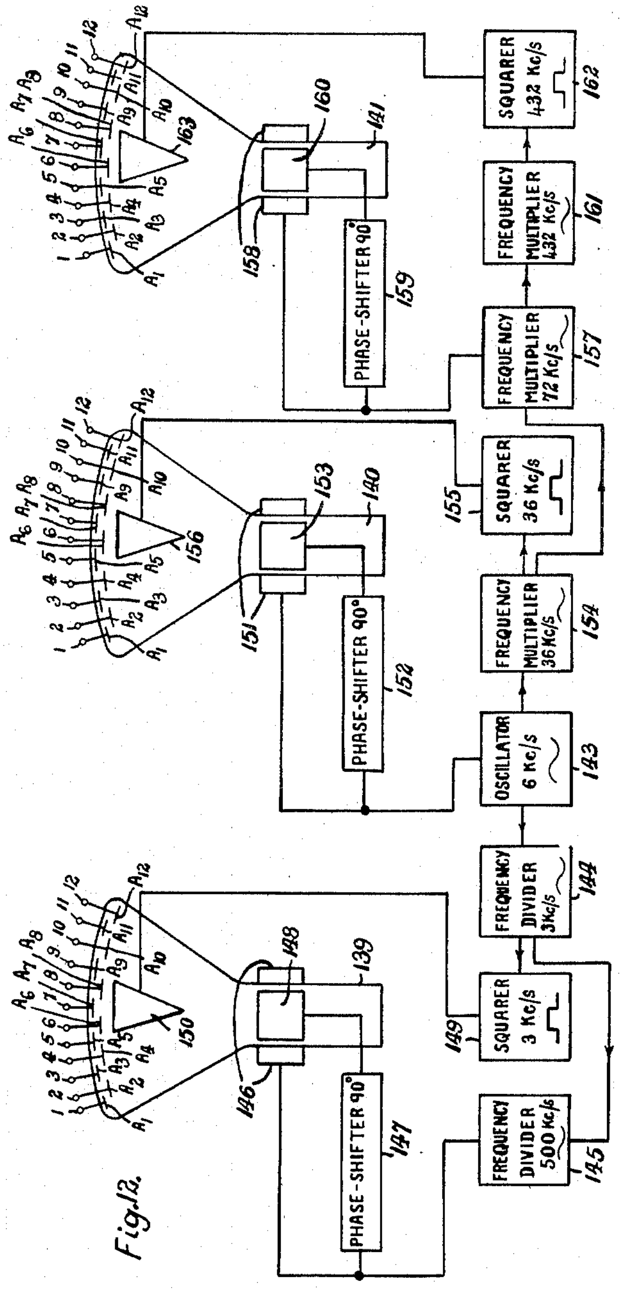
Figure 14:
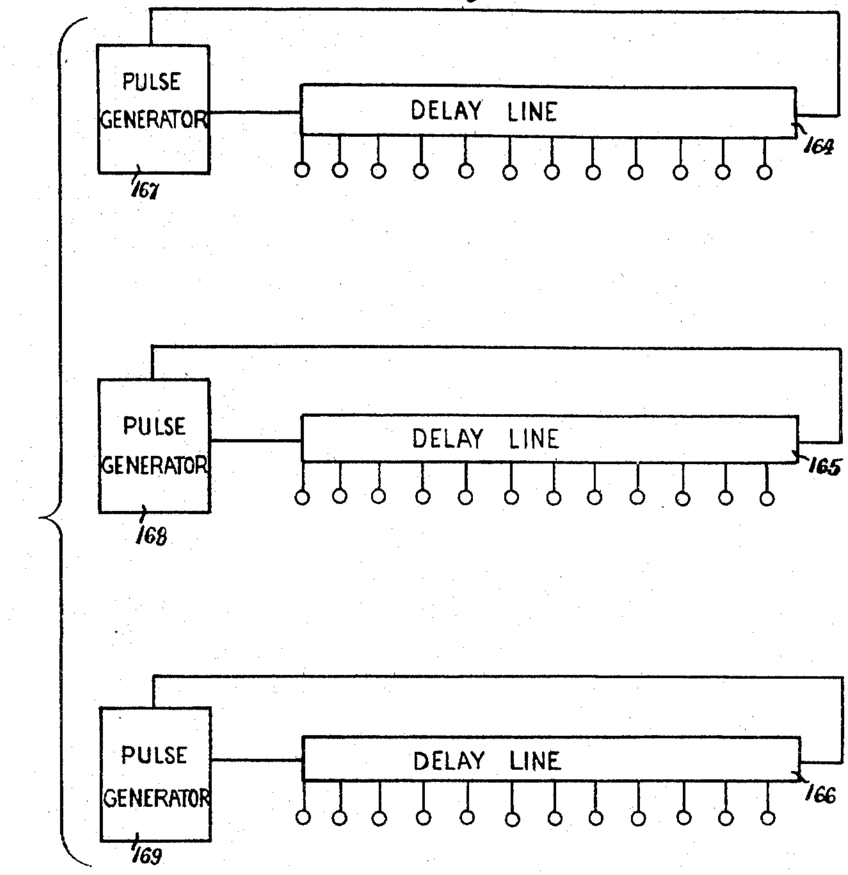

Figure 7 is a schematic diagram of a third telephone exchange embodying apparatus according to the invention, Figure 8 is an explanatory diagram, Figures 9, 10 and 11 are circuit diagrams of modifications of parts of Figure 7, Figures 12 and 13 are schematic diagrams showing a pulse generator and distributor, Figure 14 is a schematic diagram of an alternative form of pulse generator and distributor.

Figure 15:
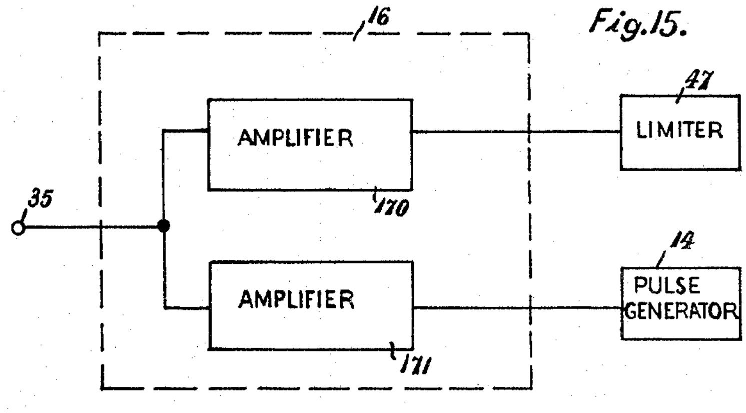
Figure 16:
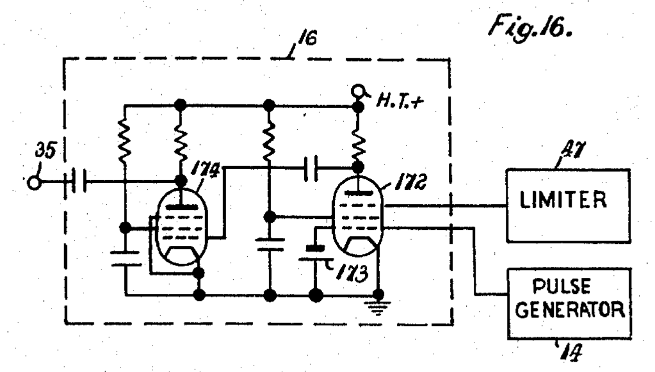
Figure 18:
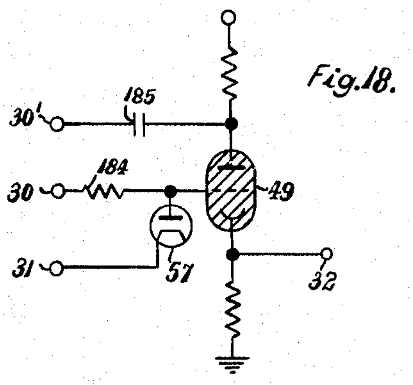
Figure 19:
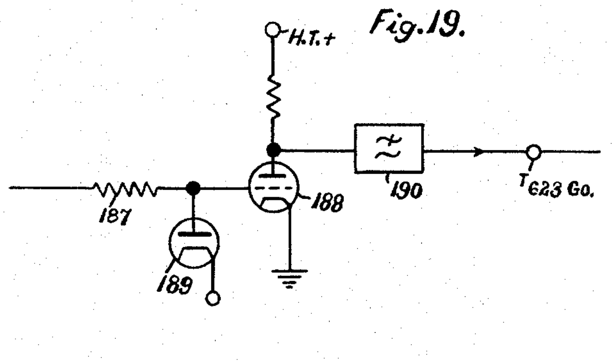
Figure 17:
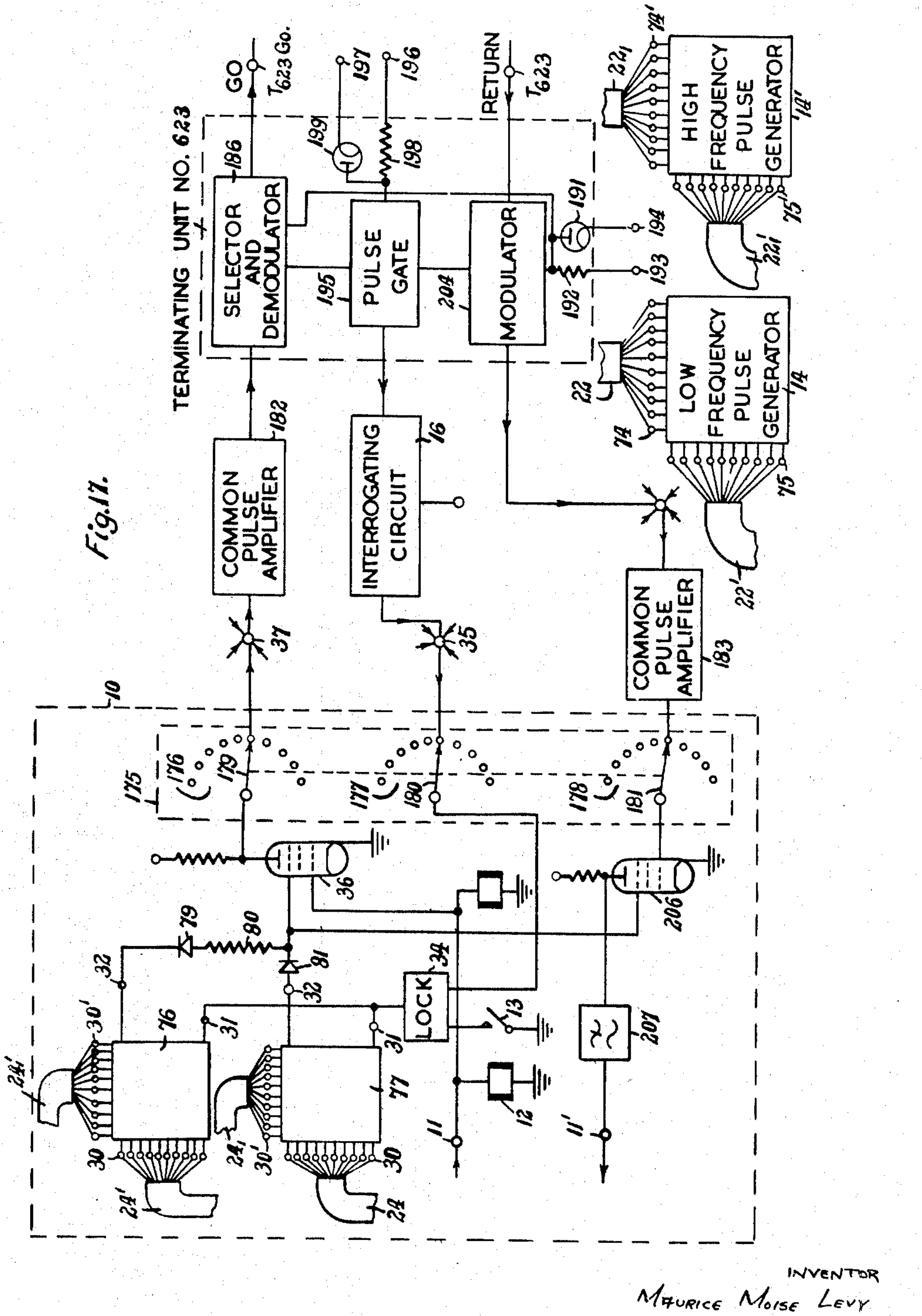
Figure 20:
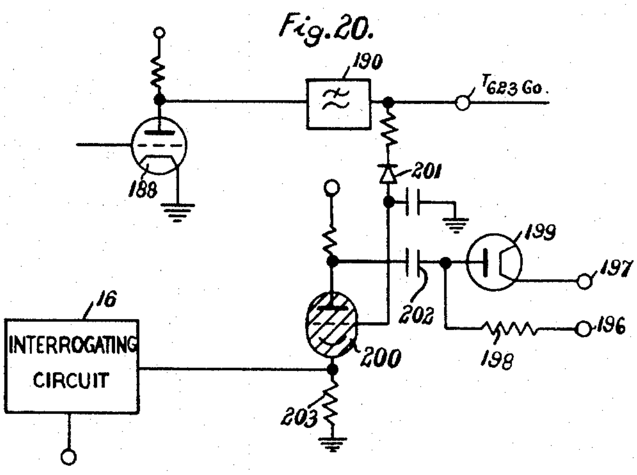
Figures 21, 23:
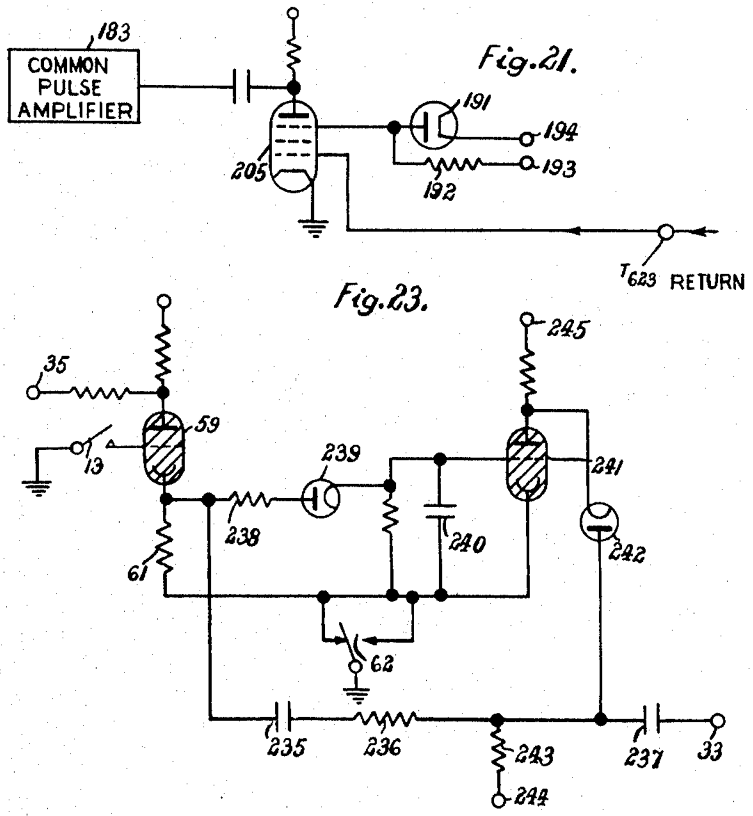
Figure 22:
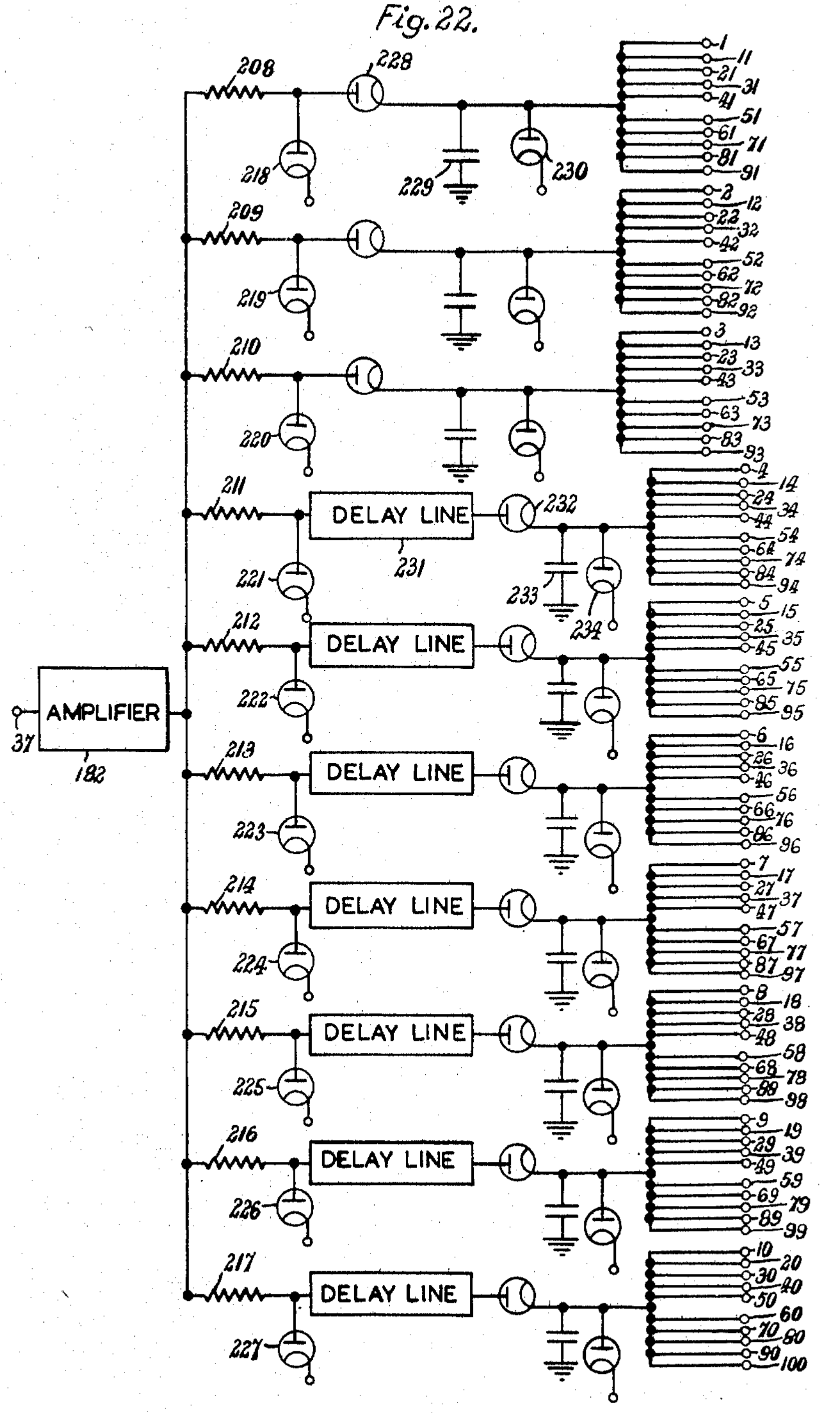
Figure 25:
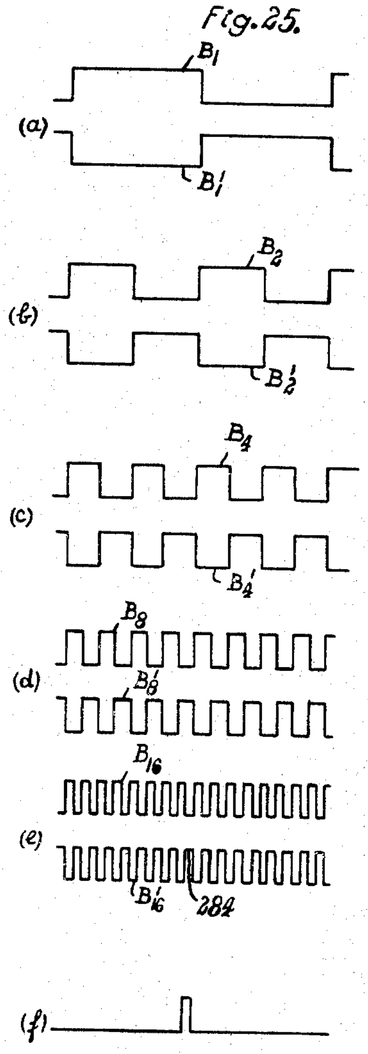
Figure 24:
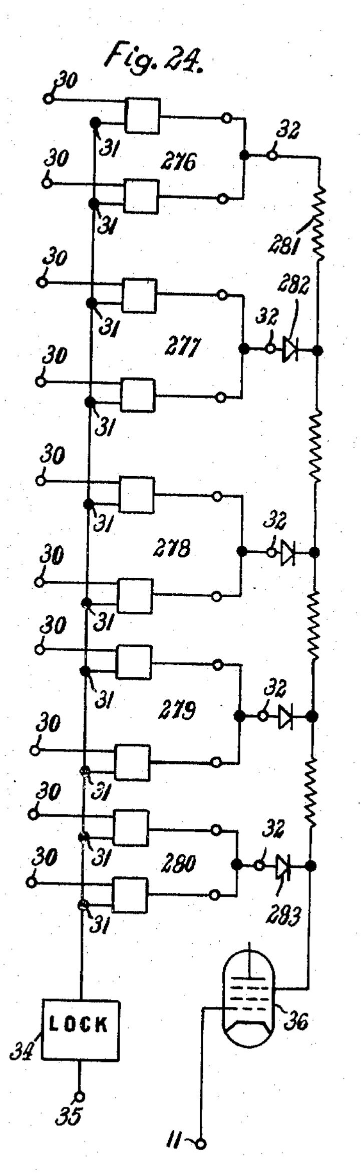
Figures 26, 28:
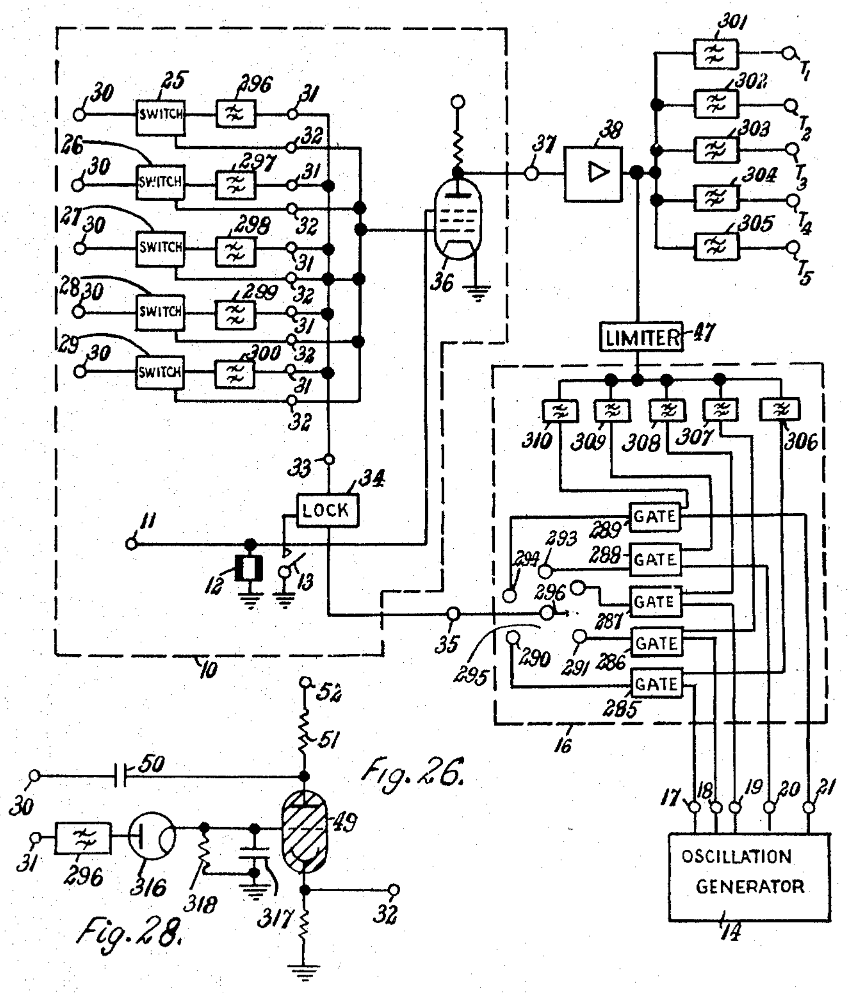
Figure 27:
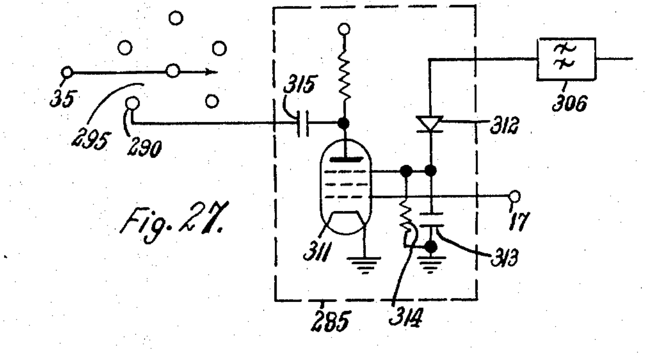

Figures 15 and 16 are schematic diagrams of two alternative arrangements for use as a part shown in block form in Figures 1, 5 and 7, Figure 17 is a block schematic diagram of a further telephone exchange embodying apparatus according to the invention, Figure 18 is a circuit diagram of a switch device suitable for use in the arrangement of Figure 17, Figure 19 is a circuit diagram of a channel pulse selector and demodulator suitable for use in the arrangement of Figure 17, Figure 20 is a circuit diagram of a pulse gate shown in block form in Figure 17, Figure 21 is a circuit diagram of a modulator shown in block form in Figure 17, Figure 22 shows a modification of the arrangement of a part of Figure 17, Figure 23 is a circuit diagram of a further lock circuit, Figure 24 is a block schematic diagram of an alternative arrangement of part of Figure 1, 5, 7 or 17, Figure 25 is an explanatory diagram, Figure 26 is a block schematic diagram of a further embodiment of the invention and Figures 27 and 28 are circuit diagrams of two parts respectively shown in block form in Figure 26.

Throughout the drawings switching and relay arrangements have been shown in simple form for convenience only. Other arrangements will be apparent to those skilled in the art.

Figure 1:
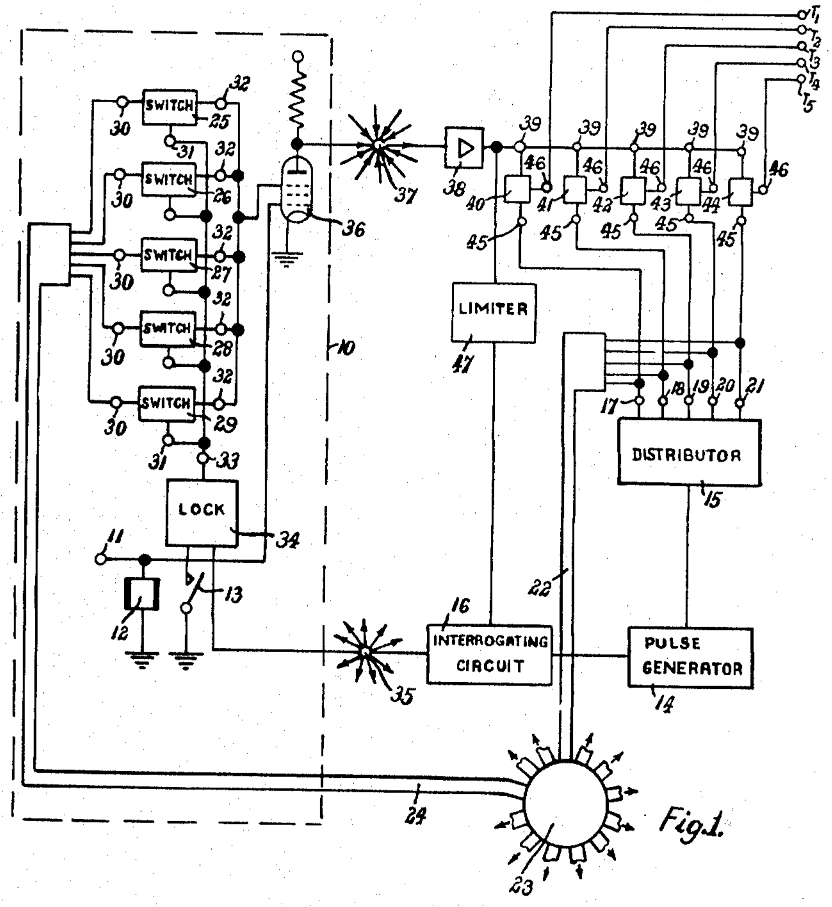

Referring to Figure 1, this is a block schematic diagram of part of a telephone exchange which is connected to a second telephone exchange (not shown) by five lines terminated at terminals $T_1$ to $T_5$ respectively. Each switch-board operator in the telephone exchange shown is provided with a jack (not shown) connected to a unit which will be hereinafter referred to as an incoming unit and will be described later. It will be assumed that there are ten operators and hence ten incoming units. One incoming unit is shown within a broken line 10, the operator's jack for this unit being connected to a terminal 11. The other nine incoming units are identical with that shown within the broken line 10 in Figure 1.

On a connection being made to the terminal 11 by way of the operator's jack, a relay winding 12 is energised closing relay contacts 13, and starting a sequence of events which, assuming one of the five lines to be free, results in the terminal 11 being connected, within a small fraction of a second, to one of the terminals $T_1$ and $T_5$ not already in use.

In order to achieve this result a generator 14 is provided to generate five interlaced pulse trains, the five pulse trains being identified with the five lines connected to the terminals $T_1$ and $T_5$ respectively. The output of the generator 14 is applied to a suitable distributor 15 and to a unit 16 which will hereinafter be referred to as an interrogating circuit and will be described later. The five pulse trains appear at five output terminals 17 to 21 respectively of the distributor and are applied through a five-core-cable 22, junction box 23, and a further five-core-cable 24 to the incoming unit 10. The five pulse trains are also applied to the other nine incoming units by cables branching from the junction box 23.

The unit 10 includes five switch devices 25 to 29, to be described later, each switch device having two input terminals 30 and 31 respectively and an output terminal 32. The five switch devices constitute an example of the aforesaid control circuit. Each of the switch devices 25 to 29 is adapted to remain open until a pulse from one of the pulse trains is applied to both its input terminals simultaneously. The five cores of the cable are connected to the five input terminals 30 respectively, whereby the five pulse trains identified with the five lines are applied to the input terminals 30 of the five switch devices respectively whereby these five switch devices also become identified with the five outgoing lines respectively. The other input terminals 31 are connected by a common lead to the output terminal of a lock circuit 34 to be described later. The output of the interrogating circuit 16 is applied through an output terminal 35 to the lock circuit 34 which serves to allow only one pulse to pass therethrough, this pulse being the first to occur in the output of the interrogating circuit after the contacts 13 close. The output terminal 35 of the interrogating circuit is also connected to the lock circuit of the other nine incoming units.

After the contacts 13 close, therefore, only one of the switch devices 25 to 29 closes. The switch device which closes is that to whose input terminal 30 is applied the pulse train containing a pulse coincident with the single pulse passed by the lock circuit 34 and hence applied to the parallel connected input terminals 31. As will be described later, it is arranged that the output of the interrogating circuit 16 contains only those pulse trains which are identified with the terminals $T_1$ to $T_5$ not in use. Whichever of the switch devices 25 to 29 is operated indicates, therefore, one of the terminals $T_1$ to $T_5$ identified by the interrogating circuit as being free.

It is arranged that when any one of the switch devices 25 to 29 closes the pulses applied to its input terminal 30 are transmitted to its output terminal 32. All the output terminals 32 are connected together and to the suppressor grid of a pentode valve 36. Suitable bias is applied to the pentode 36 to render it non-conducting until the pulses from one of the terminals 32 are applied to the suppressor. It will be seen that the terminal 11 is connected to the control grid of the pentode 36, and hence any voltages applied to the terminal 11 amplitude-modulate the pulses of anode current flowing in the valve 36.

The anode of the valve 36 is connected to an output terminal 37 and the modulated pulses are applied through an amplifier 38 to the input terminals 39 of five gates 40 and 44 respectively. It is arranged that each of these gates remains closed except when there is applied simultaneously to the input terminal 39 and a second input terminal 45, a pulse from the same pulse train. The five input terminals 45 are connected to the five output terminals 17 to 21 respectively of the distributor 15. When a pulse train appears on the parallel-connected input terminals 39 the only one of these gates which opens is that to whose input terminal 45 is applied the corresponding pulse train directly from the terminals 17 to 21. When one of the gates 40 to 44 opens the pulses applied to its input terminal 39 are transmitted to an output terminal 46. The five output terminals 46 are connected to the five line terminals $T_1$ to $T_5$ respectively.

The output from the pentodes 36 in the other nine incoming units are also applied to the terminal 37, and hence whenever one of these units is in use one of the five pulse trains appears at the terminal 37 and, therefore, in the output of the amplifier 38. The output of the amplifier 38, in addition to be applied to the terminals 39 of the gates 40, is applied through a limiter 47 to the interrogating circuit 16. It is arranged that a pulse train applied to the interrogating circuit from both the limiter 47 and the generator 14 does not appear at the output terminal 35. It may be arranged, for example, that the pulses applied from the limiter are of the same amplitude but oppose those applied from the generator 14 whereby cancellation is effected.

Summarising the action of the circuit of Figure 1, assuming that at least one of the terminals $T_1$ to $T_5$ is free, when the contacts 13 close the next succeeding pulse in the output of the interrogating circuit passes through the lock circuit 34 and causes operation of that one of the switch devices 25 to 29 to whose input terminal 30 is applied the pulse train containing a pulse coincident with the pulse passed by the lock circuit 34. This pulse train is then passed through the valve 36 and amplifier 38 to the interrogating circuit 16 in order to suppress this pulse train from the output of the interrogating circuit, whereby a subsequent call through one of the other nine incoming units cannot receive an indication that the line identified by this pulse train is free. The output of the amplifier also passes through the appropriate one of the gates 40 to 44 to the line identified as being free by the pulse passed by the lock device 34. The pulse train passed to the free line may be modulated, say by speech or dialling pulses, and a low-pass filter may be included between each of the gates 40 to 44 and the terminals $T_1$ to $T_5$ respectively.

Figure 2:
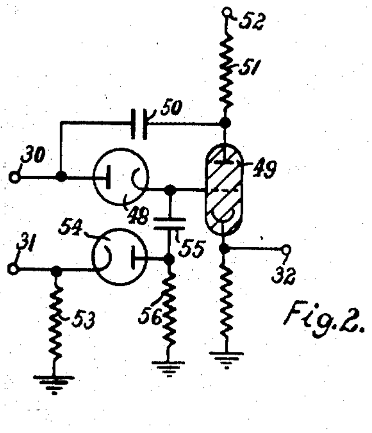

Referring to Figure 2, this shows one possible circuit of each of the switch devices 25 to 29 of Figure 1. The input terminal 30 is connected to the anode of the diode 48 whose cathode is connected to the control grid of a gas-filled triode 49, preferably of the cold-cathode type. The input terminal 30 is also connected through a capacitor 50 to the anode of the valve 49 which is connected through a resistor 51 to the positive terminal 52 of a source (not shown) of high tension voltage whose negative terminal is earthed. The cathode load of the valve 49 may, if preferred, be connected to a point of negative potential. The input terminal 31 is connected to earth through a resistor 53 and to the cathode of a diode 54 whose anode is connected through a capacitor 55 to the control grid of the valve 49. The anode of the diode 54 is also connected to earth through a resistor 56. It is arranged that the pulses applied to the terminal 30 from the distributor 15 (Figure 1) are positive-going and that the pulses applied to the terminal 31 from the lock circuit 34 (Figure 1) are negative-going, and it will be assumed that it is necessary to make the voltage on the control grid of the valve 49, 60 volts positive relatively to the cathode for a period of at least twenty micro-seconds before the valve strikes. It is arranged that the amplitude of the pulses applied to the terminals 30 and 31 are each 50 volts, and that the time constant of the capacitor 55 and resistor 56 is long compared with the repetition period of the pulses in the five pulse trains.

Assuming first of all that pulses are applied to the terminal 30 and not to the terminal 31. The capacitor 55 becomes charged to 50 volts making the control grid of the valve 50 volts positive and because of the long time constant of the capacitor 55 and resistor 56 this voltage is maintained at substantially 50 volts which is ten volts below the striking voltage of the valve 49. Assuming now that a negative-going pulse appears at the terminal 31 simultaneously with a positive-going pulse at the terminal 30, the potential difference between the two terminals 30 and 31 is 100 volts, both diodes 48 and 54 conduct and the capacitor 55 becomes charged to 100 volts. This charge is held in the capacitor 55 for a period of time substantially exceeding 20 micro-seconds and hence the valve strikes. Subsequent pulses applied to the terminal 30 are transmitted through the valve 49 to the output terminal 32. It will be appreciated, therefore, that this arrangement will function irrespective of whether the duration of the pulses is longer or shorter than 20 micro-seconds.

Figure 3:
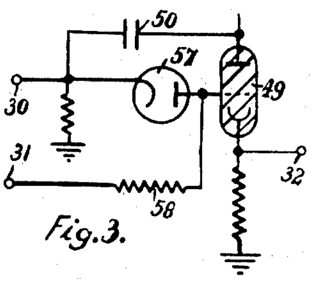

Referring to Figure 3, this shows a simplified form of the arrangement of Figure 2 for use when the duration of the pulses exceeds 20 micro-seconds. In this arrangement the input terminal 30 is connected to the cathode of a diode 57 whose anode is connected to the control grid of the valve 49. The terminal 31 is connected to the control grid through a resistor 58. It is arranged that pulses applied to both terminals 30 and 31 are positive-going and of an amplitude of 70 volts. Assuming that a pulse is applied to the terminal 31 in the absence of a pulse at the terminal 30, the diode 57 conducts and it is arranged that the consequent voltage drop across the resistor 58 is 20 volts whereby the voltage on the control grid of the valve 49 is 10 volts below striking level. If two pulses are applied simultaneously to the two terminals 30 and 31 respectively however, the diode remains insulating and the full 70 volts are applied from the terminal 31 to the control grid of the valve 49. As the duration of the pulse is in excess of 20 micro-seconds the valve strikes and subsequent pulses applied to the terminal 30 are transmitted through the capacitor 50 and the valve 49 to the output terminal 32.

Referring to Figure 4, this shows one arrangement of the lock circuit of Figure 1. The terminal 35 is connected to the anode of a gas-filled triode 59 whose control grid is connected to earth through the contacts 13. The cathode of the valve 59 is connected to a terminal 60 at a potential of —90 volts through a cathode resistor 61 and contacts 62, the latter being normally closed except for a brief period when the relay winding 12 is being energised or de-energised. Until the winding 12 is energised the cathode of the valve 59 is at —90 volts but as the control grid is not connected to earth or any other point of suitable fixed potential the valve does not strike. When the winding 12 is energised, however, the grid of the valve 59 is earthed and hence the valve strikes. As a result of anode current flowing in the resistor 61 the potential of the cathode of the valve 59 rises to —10 volts. The cathode of the valve 59 is connected through a coil 63 to the control grid of a triode 64 forming part of a blocking oscillator. The anode circuit of the triode 64 contains a coil 65 connected in parallel with a capacitor 66 to form a tuned circuit, the coil 65 being tightly coupled to the coil 63 in the grid lead. The cathode lead of the triode 64 includes a capacitor 67 connected in shunt with a resistor 68.

When the cathode of the valve 59, and hence the control grid of the valve 64, is at —90 volts the blocking oscillator cannot oscillate. When the valve 59 is struck the blocking oscillator still cannot oscillate but its grid potential is raised to —10 volts and it is arranged that the pulses applied to the terminal 35 are positive-going and of substantial amplitude whereby the first pulse appearing at the terminal 35 after the tube 59 has struck raises the potential of the grid of the valve 64 to a positive value whereby the blocking oscillator goes into oscillation.

Towards the end of the first half-cycle of oscillation the oscillator is blocked by the charge in the capacitor 67 and hence only one pulse appears at the output terminal 33. The width of this pulse is determined by the values of the components in the oscillator. The positive pulse appearing at the cathode of the valve 64 is applied through a capacitor 69 to the control grid of a gas-filled cold-cathode triode 70 whose grid is normally biased at —30 volts through a resistor 71. The cathode of this valve is connected through relay contacts 62′ to the terminal 60′ at —150 volts potential. When the positive pulse is applied to the control grid of the valve 70, this valve strikes and anode current flowing through a load resistor 72 causes a voltage drop reducing the anode potential of the valve 70 to about —20 volts. This potential is applied through a diode 73 to the control grid of the triode 64 and hence prevents the blocking oscillator from responding to further pulses applied thereto from the terminal 35. These conditions remain until the relay winding 12 is de-energised, at say the end of a telephone conversation, causing the contacts 62 to be momentarily opened whereby the valves 70 and 59 are both extinguished. It may be arranged that each pulse generated by the blocking oscillator is longer than the pulses appearing at the terminal 35 but not more than twice as long.

Figures 5, 6:
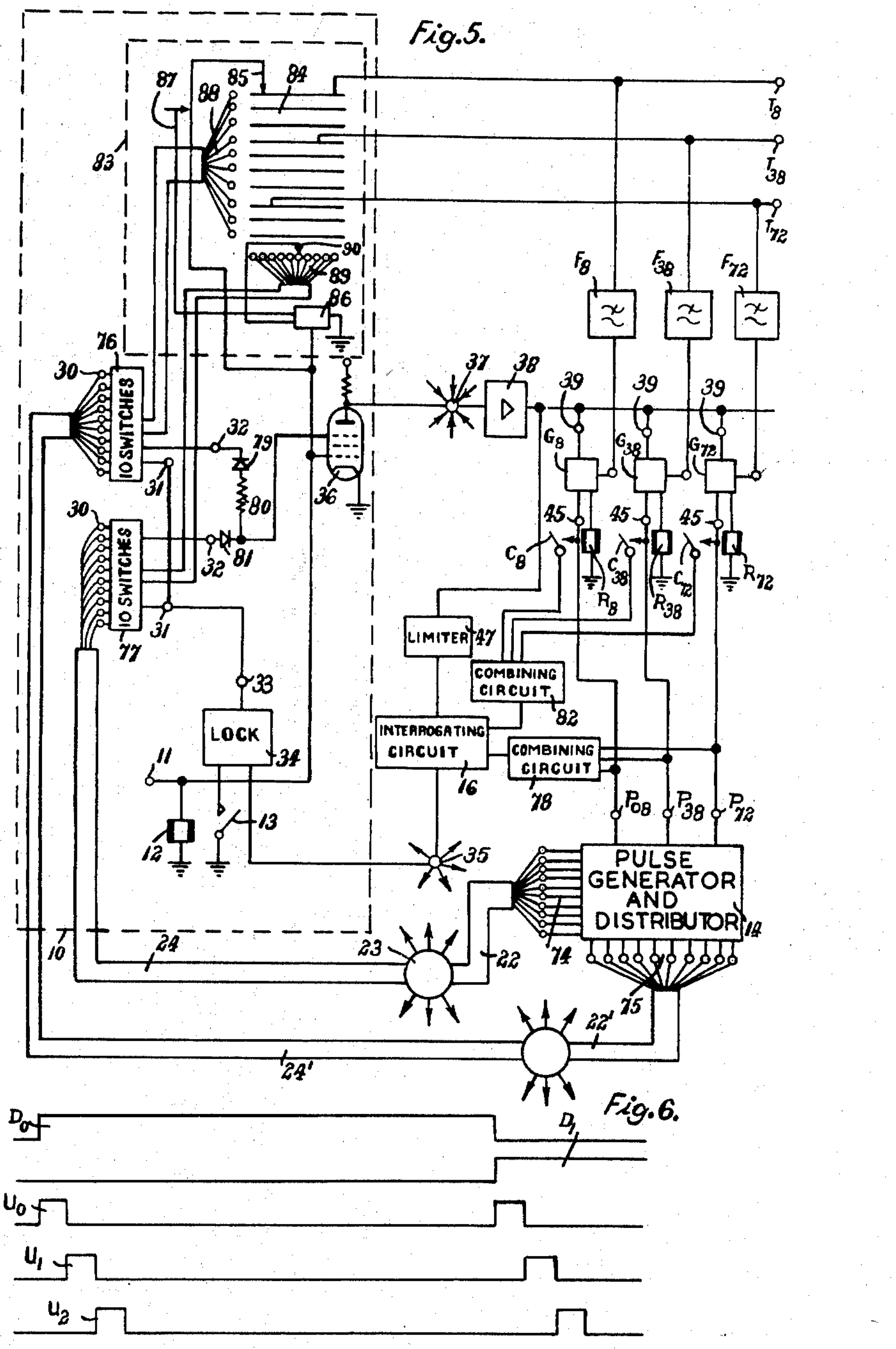
Figure 5 is a schematic diagram of a second telephone exchange embodying apparatus according to the invention.
Figure 6 is an explanatory diagram.

Referring now to Figure 5, this is a block schematic diagram of part of a telephone system in which two stations are connected by a hundred channels. At one of the stations the channels are terminated at 100 terminals of which only three—$T_8$, $T_{38}$ and $T_{72}$—are shown. In this case the generator 14 generates two sets of interlaced plus trains each set comprising ten trains. The repetition frequency of the pulses in one set of trains hereinafter referred to as the U pulses is arranged to be ten times that of the pulses in the other set of trains hereinafter referred to as the D pulses. The frequences may be, for example, 5 kc./s. and 500 c./s. respectively. The U pulses in the first train will be referred to as pulses $U_0$, the U pulses in the second train as pulses $U_1$, and so on up to pulses $U_9$. Similarly the ten trains of D pulses will be referred to as pulses $D_0$ to $D_9$ respectively. The pulses $U_0$ to $U_9$ are applied to ten output terminals 74 respectively and the pulses $D_0$ to $D_9$ are applied to ten output terminals 75 respectively. Figure 6 shows two of the D pulses $D_0$ and $D_1$ and three of the U pulses $U_0$ to $U_2$.

The five switch devices 25 to 29 of Figure 1 are replaced, in the embodiment of Figure 5, by two groups 76 and 77 of like switch devices, each group containing ten switch devices. The switch devices may again be as shown in Figure 2 or 3. The D pulses $D_0$ to $D_9$ are applied to the input terminals 30 of the switch devices respectively in the group 76, and the U pulses $U_0$ to $U_9$ are applied to the input terminals 30 of the switch devices respectively in the group 77. The D and U pulses are also combined in the generator 14 in such a manner that there are produced 100 interlaced pulse trains, each pulse in each train having the width of a U pulse and occurring simultaneously with one of the U pulses. Any suitable means may be used for this purpose. These pulses will be referred to by the letter P followed by a number, for example $P_{52}$, indicating that this pulse corresponds to the U pulse $U_2$ occurring during the D pulse $D_5$. These 100 pulse trains are applied to 100 terminals respectively of which only three are shown at $P_{08}$, $P_{38}$ and $P_{72}$, these references indicating the P pulses appearing at the terminals respectively. All the pulses $P_{00}$ to $P_{99}$ are combined in a suitable circuit 78 and thence applied to the interrogating circuit 16.

When the contacts 13 are closed by the operation of the relay 12 the first P pulse appearing at the output terminal 35 of the interrogating circuit passes through the lock circuit 34 to the common input terminals 31 of the two groups 76 and 77 of switch devices. The pulses $U_0$ to $U_9$ are applied to the input terminals 30 of the switch devices respectively in the group 77, and the pulses $D_0$ to $D_9$ are applied to the input terminals 30 of the switch devices respectively in the group 76. The P pulse passed by the lock circuit 34 results therefore in only one switch device in the group 77 being operated. For example, assume the P pulse to be $P_{72}$ then the two switch devices to whose input terminals 30 are applied the pulses $D_7$ and $U_2$ respectively are operated. Pulses $D_7$ appear at the output terminal 32 of the group 76 and pulses $U_2$ appear at the output terminal 32 of the group 76. The only $U_2$ pulses required to be passed to the suppressor grid of the valve 36, however, are those which occur during the $D_7$ pulses. In order to achieve this, the D pulses are applied to the suppressor grid of the valve 36 through a rectifier 79 and resistor 80 and the U pulses are applied to the suppressor grid of the valve 36 through a recitifier 81. $D_7$ pulses occuring in the absence of $U_2$ pulses are substantially short-circuited by the rectifier 81. When a $U_2$ pulse occurs, however, this holds the rectifier 81 insulating, whereby a pulse is transmitted to the suppressor grid of the pentode 36, this pulse occurring at the same time as the $U_2$ pulse and having a duration equal thereto. Cancellation of the pulses $P_{72}$ in the output of the interrogating circuit is initially achieved as previously described with reference to Figure 1. 100 gates are also connected between the output of the amplifier 38 and the terminals terminating the 100 channels respectively. These gates function in like manner to the gates 40 to 44 in Figure 1 and three are shown at $G_8$, $G_{38}$, $G_{72}$ connected to the terminals $T_8$, $T_{38}$ and $T_{72}$ respectively, through low pass filters $F_8$, $F_{38}$ and $F_{72}$.

The unit 10 also contains a mechanical switch shown within a broken line 83, this switch having ten banks each of ten contacts, the ten banks being shown conventionally by the ten parallel lines 84. The terminal $T_8$ is connected to the eighth contact in the first bank, the terminal $T_{38}$ to the eighth contact in the fourth bank and so on. This switch has a movable contact 85 capable of being moved to any one of the 100 contacts on the switch 84 by being moved firstly to the end of the appropriate bank and then inwardly to the appropriate contact. When the relay 12 is operated closing the contacts 13, and the groups 76 and 77 of switch devices have been set by the pulse passed by the lock circuit 34, a solenoid 86 is energised and causes the arm 85 to move across the end of the banks 84 of contacts. An auxiliary moving contact 87 is carried at the same time over ten auxiliary fixed contacts 88. These ten auxiliary fixed contacts are connected to the ten switch devices respectively in the group 76 and it is arranged, in any suitable manner, that when a switch device is fired a bias is applied to the auxiliary fixed contact 88 to which it is connected. When the auxiliary moving contact reaches the auxiliary fixed contact which is biased it is arranged in any suitable manner to arrest the movement of the contact 85 of the ends of the banks 84, and to set this contact moving over the ten contacts in the bank. A further ten auxiliary fixed contacts 89 and a further auxiliary moving contact 90 are provided, and it is arranged that whenever a switch device in the group 77 is fired a bias is applied to an appropriate one of the contacts 89. The auxiliary moving contact 90 is carried by the contact 85 when the latter moves over the contacts in one of the banks 84. When the auxiliary contact 89 to which the bias is applied is reached by the contact 90 the movement of the contact 85 is arrested and this contact is therefore connected to the outgoing channel or line whose terminal number is identified with that of the P pulse passed by the locking circuit. The contact 85 is connected to the terminal 11 which is therefore connected on to the identified free outgoing line.

The gates $G_8$, $G_{38}$ and $G_{72}$ also serve in any suitable manner to operate relays $R_8$, $R_{38}$ and $R_{72}$ respectively having contacts $C_8$, $C_{38}$ and $C_{72}$ respectively. The contacts $C_8$, $C_{38}$ and $C_{72}$ connect terminals $P_{08}$, $P_{38}$ and $P_{72}$ respectively to a phase inverter and combining circuit 82 whose output is applied to the interrogating circuit and hence effects cancellation of the pulses $P_{08}$, $P_{38}$ and $P_{72}$ in the interrogating circuit. The electronic part of the incoming unit 10 may then be switched off if desired whilst maintaining cancellation of P pulses identified with engaged channels. In this way an electronic by-pass is provided around the mechanical switch until the mechanical switch is adjusted to its correct setting. This by-pass may conveniently be used for transmitting switching pulses to the distant station.

Where it is required to connect an incoming call in a trunk switching centre to one of a number, say ten, of outgoing junctions, each junction containing say 100 lines, various arrangements may be used such as, for example, ten separate arrangements as shown in Figure 5, one for each out-going junction, the ten arrangements being supplied from a common pulse generator. It may sometimes be preferred however, to use an arrangement as shown in Figure 7.

In Figure 7 the generator 14 generates three groups of pulses which will be referred to as the U pulses, D pulses and C pulses respectively, and are arranged relatively to one another as shown in Figure 8. In Figures 8(*a*) and 8(*b*) each vertical line represents a C pulse. In Figure 8(*c*) a D pulse is shown at $D_1$ and another at $D_2$ and in Figure 8(*d*) ten U pulses are shown at $U_1$ to $U_9$ and $U_0$ respectively. The C pulses are generated in recurring groups each of 1,000 pulses, each group being composed of ten sections, each section containing 100 pulses arranged in ten batches of ten pulses each, the pulses in each batch being equally spaced. Adjacent groups are separated by the width of two D pulses, adjacent batches are separated by the width of two C pulses and adjacent sections by the width of two U pulses. Each U pulse occupies the same interval of time as one of the batches, and each D pulse occupies the same interval of time as ten U pulses and hence one section of the C pulses. The C pulses are distributed by any suitable means to ten output terminals 91 on the generator 14 (Figure 7). The way in which the C pulses are distributed to the ten terminals 91 is shown in Figure 8(*b*). It is arranged that the first pulse in each batch is applied to one of the terminals 91 (Figure 7), these pulses are shown in Figure 8(*b*) as pulse C. The second pulse in each batch is applied to a second of the terminals 91, these pulses are shown as pulses $C_2$. Similarly the third to the tenth pulse in each batch are applied to the remaining eighth of the terminals 91 respectively and are shown in Figure 8(*b*) as pulses $C_3$ to $C_9$ and $C_0$ respectively. For every group of 1,000 C pulses there are, therefore, 100 $C_1$ pulses, 100 $C_2$ pulses and so on. For each D and U pulse combination there is only one $C_1$ pulse, one $C_2$ pulse and so on. In order to identify one pulse in the 1,000 of each group of C pulses it is necessary therefore merely to select the appropriate one of the pulses $D_1$ to $D_9$ and $D_0$, the appropriate one of the pulses $U_1$ to $U_9$ and $U_0$ and the appropriate one of the series $C_1$ to $C_9$ and $C_0$. One suitable arrangement of so doing will now be described with reference to Figure 7.

On the contacts 13 being closed and dialling pulses applied to the terminal 11 to determine the out-going junction to be selected a known switch device is operated and its moving contact 93 moves to one of ten fixed contacts 94 to which the series of pulses $C_1$ to $C_9$ and $C_0$ are applied respectively by way of a cable 24. The pulses $C_1$ to $C_9$ and $C_0$ are identified with the ten out-going junctions. At the moving contact 93 there appear only those C pulses which are identified with the selected junction. These pulses are applied to a gate 95 connected between the interrogating circuit 16 and the lock circuit 34.

All the C pulses are applied to the interrogating circuit but because of the gate 95 the only C pulses allowed to reach the lock circuit 34 are those identified with the selected junction. The D pulses are applied to the input terminals 30 of the switch devices respectively in the group 76 by way of cable 24, and the U pulses are applied to the input terminals 30 of the switch devices respectively in the group 77 by way of cable 24. When a C pulse passes the lock circuit 34 the only two switch devices in the groups 76 and 77 to be fired are those to whose input terminals 30 are applied the D and U pulses respectively occurring at the same time as the C pulse passed by the lock circuit 34. The moving contact 93 of the switch 92 is also connected to the junction of the rectifier 79 and resistor 80 and hence the only pulses in the series selected by the contact 93 to pass to the junction of the resistor 80 and rectifier 81 at substantial amplitude are those which occur during the D pulses passed by the fired switch device in the group 76, which render the rectifier device 79 insulating. Similarly the only pulses reaching the suppressor grid of the pentode 36 are those occurring during the U pulses passed by the fired switch device in the group 77. Of each group of 1,000 C pulses only one, therefore, reaches the terminal 37. Cancellation is effected in the interrogating circuit as previously described.

The C pulses appearing at the output of the amplifier 38 are also applied to the suppressor grids of ten pentodes 96 to whose grids are applied the series of C pulses $C_1$ to $C_9$ and $C_0$ respectively through a ten-core cable shown in part at 97. The anode of each of the valves 96 is connected to a demodulator and gate device of which two are shown within broken lines 97' and 98 and will be described later.

The D, U and C pulses are applied to the distributor 15 which has, in this example, 2,000 output terminals arranged in 1,000 pairs. The C pulses in each group of 1,000 pulses are applied to the 1,000 pairs respectively, the polarities of the pulses applied to each pair of output terminals being of opposite sign. Four output terminals are shown, namely, one pair $P_{583}$, one from the pair $P_{582}$ and one from the pair $P_{584}$.

The demodulator and gate arrangement 97' comprises a series resistor 99, a shunt diode 100 whose cathode is connected to the terminal $P_{582}$. It is arranged that the pulses at this terminal are positive-going and serve to gate the diode 100. It is only when these pulses are applied to the cathode of the diode 100 that the positive-going pulses from its associated one of the valves 96 are allowed to pass. These pulses charge a capacitor 101 through a diode 102. The capacitor 101 holds this charge for the duration of 1,000 pulses when a negative-going pulse from the terminal $P_{581}$ (not shown) applied to the cathode of a diode 103 causes the capacitor 101 to be discharged. The capacitor is then recharged by the next succeeding pulse corresponding to $P_{582}$ appearing at the anode of the diode 100. The output of the triode 104 between whose grid and cathode the capacitor 101 is connected contains broad pulses in channel 582. These broad pulses are applied through a filter $F_{582}$ to the terminal $T_{582}$. The modulating voltage applied at the terminal 11 is, therefore, reproduced at the terminal $T_{582}$.

A mechanical connection may also be made from the terminal 11 to the terminal $T_{582}$ by providing ten units 83 as described with reference to Figure 5, one for each outgoing junction. The moving contacts of the units 83 are connected to the ten fixed contacts respectively of a switch device 105 whose moving contact is connected to the input terminal 11 and ganged to the contact 93 of the switch 92.

It will be appreciated that the number of outgoing junctions in a switching centre may be smaller or greater than ten and the number of lines in each junction will usually not be the same but suitable modifications to the arrangements described to meet the various requirements that may arise will be apparent to those skilled in the art.

Although the arrangement of Figure 7 is such that each incoming unit is capable of hunting over all lines in each junction, it may be arranged in any suitable manner that each unit hunts over only a fraction of the lines in each junction. This may be achieved by grading the pulses applied to each incoming unit, for example, by connecting a gate between the terminal 35 and the unit and opening the gate to admit a predetermined number of pulses through. On the other hand the C pulses applied to the switch 92 may be suitably graded.

Furthermore it will usually be necessary to amplify the output pulses from the valves 96 in order to facilitate demodulation. It may also be preferred to broaden these pulses. In this case pulses $C_1$, $C_2$ and $C_3$ may be broadened by lengthening to the instant when the next succeeding $C_0$ pulse occurs, and the $C_4$ to $C_9$ and $C_0$ pulses may be delayed until the instant of commencement of the next $C_1$ pulse and then lengthened to the instant of occurrence of the next succeeding $C_0$ pulse. The distributor 15 may then be arranged to apply U pulses in a suitable sequence to the demodulators, instead of C pulses as previously described.

For example, the output circuit of the three valves 96 which pass pulses $C_1$, $C_2$ and $C_3$ may be as shown in Figure 9. It is assumed that the valve 96 in Figure 9 passes the pulses $C_1$. The anode of the valve 96 is connected to an amplifier 106 whose output is assumed to be positive-going and is applied to the anode of a diode 107. The diode 107 passes all the pulses applied to its anode and causes a capacitor 108 to become charged by each $C_1$ pulse. The capacitor 108 is shunted by a diode 109 arranged to be normally non-conducting by suitable biasing means not shown. Negative-going $C_0$ pulses are, however, applied to the terminal 110 connected to the cathode of the diode 109 and serve to render the diode 109 conducting to discharge the capacitor. In this way each $C_1$ pulse is broadened until the instant of occurrence of the next succeeding $C_0$ pulse.

It then remains to apply the lengthened $C_1$ pulses to 100 demodulators each of which serve to select one $C_1$ pulse per 100 $C_1$ pulses to broaden the selected $C_1$ pulse still further to demodulate this broadened $C_1$ pulse and to apply the demodulated intelligence to the appropriate one of the channel terminals. It will be assumed that the three digits of each channel number identify the C, D and U pulses respectively. For example, channel $T_{068}$ indicates $C_0$ pulses coincident with $D_6$ and $U_8$ pulses, $T_{138}$ indicates $C_1$ pulses coincident with $D_3$ and $U_8$ pulses and so on.

In Figure 9 one demodulator is shown within a broken line 111 and it will be assumed that the output of this demodulator is connected to channel terminal $T_{138}$ as shown. The $C_1$ pulses to be selected and dealt with by this modulator are, therefore, those which are coincident with the $D_3$ and $U_8$ pulses. All the broadened $C_1$ pulses appearing at the cathode of the diode 107 are applied through a resistor 112 to the anode of a diode 113 which is arranged to be normally conducting except on the application of a positive-going voltage to its cathode.

Referring to Figure 10 this shows an arrangement suitable for use in providing gating pulses at the cathode of the diode 113 in Figure 9. In Figure 10 positive-going $D_3$ pulses are applied through a resistor 114 to the control grid of a triode valve 115 having a cathode load resistor 116 and an output terminal 117 connected to its cathode. A diode 118 has its anode connected to the control grid of the triode 115 and is arranged to be conducting except when a positive-going pulse is applied to its cathode. Positive-going $U_8$ pulses are applied to the cathode of the diode 118 and hence those parts of the $D_3$ pulses coincident with $U_8$ pulses reach the control grid of the triode 115.

The terminal 117 is connected to the cathode of the diode 113 in Figure 9. This diode becomes non-conducting, therefore, for the duration of the $U_8$ pulse occurring during each $D_3$ pulse. The broadened $C_1$ pulse occurring during this interval is passed, therefore, to the anode of a diode 119 and charges a capacitor 120. The capacitor 120 is shunted by a diode 121 arranged to be non-conducting except when a negative-going pulse is applied to its cathode. It is arranged that a negative-going $U_7$ pulse is applied to the cathode of the diode during each $D_3$ pulse. In this way the capacitor 120 remains charged for almost the whole of the interval between successive $C_1$ pulses in channel 138. A circuit as shown in Figure 10 may be used to provide the negative-going $U_7$ pulse at the cathode of the diode 121. The anode circuit of the triode 115 contains a resistor 122 and it is arranged that $D_3$ pulses are applied through the resistor 114 to the anode of the diode 118 and that $U_7$ pulses are applied to the cathode of the diode 118.

The anode of the valve 115 is connected through a terminal 122' to the cathode of the diode 121. The voltage appearing across the capacitor 120 is applied between the control grid and cathode of a triode valve 123 whose anode is connected through a low-pass filter 124 to the channel terminal $T_{138}$.

It will be understood that when pulses $D_3$ and $U_7$ are applied to the arrangement of Figure 10, the terminal 117 connected to the cathode of the triode 115 may be conneced to the cathode of the diode 113 in the demodulator dealing with $C_1$ pulses in channel 137.

Referring to Figure 11, this shows an arrangement for use in the anode circuit of one of the valves 96 which pass C pulses $C_4$ to $C_9$ and $C_0$ respectively. The anode of the valve 96 is connected through an amplifier 125 to a delay line 126 which serves to delay each pulse passed by the valve 96 until the instant of occurrence of the next succeeding $C_0$ pulse. The narrow C pulses appearing at the output of the delay line 126 pass through a diode 127 and charge a capacitor 128. This capacitor is shunted by a diode 129 arranged to be non-conducting until the instant of occurrence of the next succeeding $C_0$ pulse. Negative-going $C_0$ pulses are applied to the cathode of the diode 129 and discharge the capacitor 128 through a terminal 130. In this way each C pulse appearing at the output of the delay line 126 is lengthened until the instant of occurrence of the next succeeding $C_0$ pulse.

It will be assumed that the valve 96 of Figure 11 passes $C_4$ pulses. It then remains to apply the lengthened $C_4$ pulses to 100 demodulators each of which serves to select one $C_4$ pulse per 100 $C_4$ pulses, to broaden the selected $C_4$ pulse still further, to demodulate this broadened $C_4$ pulse and to apply the demodulated intelligence to the appropriate one of the channel terminals.

In Figure 11 one demodulator is shown within a broken line 131 and has its output connected to channel terminal $T_{421}$. The cathode of the diode 127 is connected through a resistor 132 to the anode of a diode 133 which is arranged to be conducting except when a positive-going pulse is applied thereto. It is arranged that a positive-going $U_2$ pulse is applied to the cathode of the diode 133 during each $D_2$ pulse. The reason for using a $U_2$ pulse for channel 421 will be apparent when it is remembered that each $C_4$ pulse is delayed until the instant of occurrence of the next $C_1$ pulse and then lengthened until the instant of occurrence of the next succeeding $C_0$ pulse. The only pulses to pass the anode of the diode 133 are therefore the broadened $C_4$ pulses in channel 421.

These pass through a diode 134 and charge a capacitor 135. This capacitor is shunted by a diode 136 arranged to be nonconducting except when a negative-going pulse is applied to its cathode. It is arranged to apply the $U_1$ pulse occurring during each $D_2$ pulse to the cathode of the diode 136 to discharge the capacitor 135 and hence the $C_4$ pulses passed by the diode 134 have their durations lengthened to be equal to almost the whole of the interval between successive C pulses in channel 421. The broad pulses appearing across the capacitor 135 are applied through a triode valve 137 to a low-pass filter 138 which demodulates the pulses and applies the demodulated intelligence to the channel terminal $T_{421}$.

The arrangements for applying the appropriate pulses to the cathodes of the diodes 133 and 136 may be as shown in Figure 11.

The C, D and U pulses may be generated and distributed by an arrangement as shown in Figure 12 which comprises three cathode ray tube distributors 139, 140 and 141. Each tube has twelve anodes $A_1$ to $A_{12}$ distributed around the face thereof in the manner shown in Figure 13, from which it will be seen that each anode overlaps two others in the radial direction. The electron beam is made to follow the path indicated by the broken line 142 in Figure 13. In the tube 139 the beam is caused to make 500 revolutions per second, in the tube 140 6,000 revolutions per second, and in the tube 141 72,000 revolutions per second.

Rotation of the beams in the three distributors is produced in any suitable manner. In the present example a master oscillator 143 is tuned to 6 kc./s. One output from the master oscillator 143 is passed through a frequency divider 144 of any known or suitable type to a second frequency divider 145. The divider 144 provides a division ratio of 2:1 and the divider 145 a division ratio of 6:1 whereby the frequencies at the outputs of the two dividers respectively are 3 kc./s. and 500 c./s.

The output of the divider 145 is applied directly to the X deflection coils 146 of the tube 139, and is applied through a phase-shifting network 147 to the Y deflection coils 148 of the tube 139, the phase-shifting network 147 being arranged to produce a phase-shift of 90°.

The output of the frequency divider 144 at 3 kc./s. is also applied to a squarer 149 which is of any known or suitable type and serves to provide an oscillation of square wave form at 3 kc./s. This oscillation is applied to a central electrode 150 of the tube 139, this electrode being of conical shape as shown. The oscillation of square wave form applied to the electrode 150 causes radial deflection of the beam and it is arranged in this way that the path followed by the beam and the anodes $A_1$ to $A_{12}$ is as shown by the broken line 142 in Figure 13.

Pulses appear therefore at each of the anodes $A_1$ to $A_{12}$ at a frequency of 500 p. p. s. The pulses appearing at the anodes $A_{11}$ and $A_{12}$ are not used, and those appearing at the anodes $A_1$ to $A_{10}$ constitute the aforesaid D pulses, $D_1$ to $D_9$ and $D_0$ respectively.

A second output, at 6 kc./s., is taken from the master oscillator 143 and applied directly to the X deflection coils 151 of the tube 140, and through a phase-shifting network 152 of any known or suitable type to the Y deflection coils 153 of the tube 140. The phase-shifting network 152 is arranged to produce a phase shift of 90°. A third output is taken from the master oscillator 143 and passed through a frequency multiplier 154 of any known or suitable type to a squarer 155. The frequency multiplier 154 provides a multiplication ration of 1:6 and the oscillation of square wave form at 36 kc./s. appearing at the output of the squarer 155 is applied to the central conical electrode 156 of the tube 140. It is arranged by these means that the beam in the tube 140 follows a path over the anodes $A_1$ to $A_{10}$ therein as shown by the broken line 142 in Figure 13.

Pulses appear therefore at each of the anodes $A_1$ to $A_{12}$ of the tube 140 at a recurrence frequency of 6,000 p. p. s. The pulses appearing at the anodes $A_{11}$ and $A_{12}$ are not used and those appearing at the anodes $A_1$ to $A_{10}$ constitute the aforesaid U pulses $U_1$ to $U_9$ and $U_0$ respectively.

A further output at 36 kc./s. is taken from the frequency multiplier 154 and passed to a frequency multiplier 157 which provides a multiplication ration of 1:2 and gives an output oscillation at 72 kc./s. This is applied directly to the X deflection coils 158 of the tube 141, and through 90° phase-shifting network 159 to the Y deflection coils 160 of the tube 141. A further output at 72 kc./s. is applied from the frequency multiplier 157 through a further frequency multiplier 161 to a squarer 162. The multiplier 161 provides a multiplication ratio of 1:6 and the oscillation of square wave form at 432 kc./s. appearing at the output of the squarer 162 is applied to the central conical electrode 163 of the tube 141. It is arranged by these means that the beam in the tube 141 follows a path over the anodes $A_1$ to $A_{12}$ therein as shown by the broken line 142 in Figure 13.

Pulses appear therefore at each of the anodes $A_1$ to $A_{12}$ in the tube 141 at a frequency of 72,000 p. p. s. The pulses appearing at the anodes $A_{11}$ and $A_{12}$ are not used and those appearing at the anodes $A_1$ to $A_{10}$ constitute the aforesaid C pulses $C_1$ to $C_9$ and $C_0$ respectively.

Although an arrangement has been described involving the use of rotating beam cathode ray tube distributors for generating the pulses other suitable arrangements may of course be used. For example, Figure 14 shows a suitable arrangement using delay lines 164, 165 and 166, and pulse generators 167, 168 and 169. The pulse generator 167 is arranged to generate regularly recurring pulses say the $D_1$ pulses. These are applied directly to an output terminal shown as a terminal 1 at the input end of the delay line 164. There are twelve output terminals 1 to 12 connected to the delay line 164 as shown at suitable tapping points and it is arranged that the pulses applied to the line 164 from the pulse generator 167 cause pulses to appear at the terminals 1 to 12 corresponding to those appearing at the terminals 1 to 12 of the cathode ray tube distributors 139 of Figure 12.

Similarly it is arranged that the pulse generator 168 generates the $U_1$ pulses and that the pulses appearing at the terminals 1 to 12 of the delay line 165 correspond to those appearing at the terminals 1 to 10 of the cathode ray tube distributor 140 of Figure 12.

It is arranged that the pulse generator 169 generates the $C_0$ pulses and that the pulses appearing at the terminals 1 to 12 of the delay line 166 correspond to those appearing at the terminals 1 to 12 of the cathode ray tube distributor 141 of Figure 12.

The interrogating circuit 16 of Figure 1 may be as shown in Figure 15 in which the output of the limiter 47 is applied to an amplifier 170, and the pulses from the pulse generator 14 are applied to an amplifier 171. It is arranged that the pulses appearing at the outputs of the two amplifiers are equal and opposite. The outputs of the two amplifiers are connected in parallel to the terminal 35.

Figure 16 shows a further example of the interrogating circuit 16 of Figure 1. In this example the pulses from the pulse generator 14 are applied to the control grid of a pentode valve 172 which is suitably biased by a bias source 173 to be non-conducting in the absence of pulses on the control grid which are arranged to be positive-going. The output of the limiter 47 is arranged to be negative-going and of an amplitude sufficient to render the pentode 172 non-conducting in the presence of a pulse from the generator 14. The output of the valve 172 is passed through a phase inverting-valve 174 to the terminal 35.

The interrogating circuits of Figures 15 and 16 may, of course be used in Figures 5 and 7 as well as in Figure 1.

Where there are a large number of channels, say 100 or more, the repetition frequency of the pulses used to identify the channels will usually be too low to enable speech to be satisfactorily transmitted by modulating the pulses therewith. Switches, such as the switch 83 in Figures 5 and 7 are used, therefore, in making the speech conection. It can be arranged, however, that once the incoming unit is operated pulses of a recurrence frequency sufficiently high to carry speech are applied to the suppressor grid of the valve 36. These pulses are arranged in interlaced trains identified with the several channels respectively, it being arranged that pulses in the channel identified by the incoming unit are applied to the suppressor grid of the valve 36.

Figure 17 is a block diagram of part of a further telephone exchange including an embodiment of the present invention. In the arrangement of Figure 17 provision is made for establishing a connection with a free line in any one of ten junctions, each junction having 100 lines. Only 100 pulses are used, instead of the 1,000 C pulses as described with reference to Figure 7, to identify the 1,000 lines, and the speech connections are effected by means as described in the last preceding paragraph. The manner in which speech on the return lines can be dealt with is also shown.

The incoming unit 10 in Figure 17 contains a uniselector 175 having three banks of fixed contacts 176, 177 and 178 each bank having ten contacts, one contact for each junction of 100 channels. In making a call the moving contacts 179, 180 and 181 of the uni-selector are set in known manner by means of dialling impulses to the fixed contact connected to the junction required. Each junction has a pulse amplifier 182 common to the channels of that junction, an interrogating circuit 16 for use with that junction and a second pulse amplifier 183 common to the channels of that junction. There are therefore in the present arrangement of ten junctions ten amplifiers 182, ten interrogating circuits 16 and ten amplifiers 183. Two pulse generators 14 and 14' are provided and are common to all junctions. The Go and Return lines of the 100 channels in the ten junctions are terminated by 1000 terminating units respectively. In the drawing the terminating unit for channel 623, that is the 23rd channel of the sixth junction is shown. The terminating units for each junction are connected to the amplifiers 182 and 183 and the interrogating circuit 16 for that junction as shown.

The pulse generators 14 and 14' are each arranged to generate ten trains of D pulses and ten trains of U pulses, the pulses generated by the generator 14 being of relatively low frequency and for identifying the channels of each junction, and the pulses generated by the generator 14' being of relatively high frequency and for carrying speech. For example the recurrence frequency of each train of D pulses generated by the generator 14 may be 50 p. p. s and that of each train of D pulses generated by the generator 14' may be 8,000 p. p. s.

The ten trains of D pulses appearing at the ten output terminals 75 respectively of the generator 14 are applied by way of the cable 22', a junction box (not shown) and the cable 24' to the ten input terminals 30 respectively of the group 76 of ten switch devices in the incoming unit 10. The ten trains of U pulses appearing at the ten output terminals 74 of the generator 14 are applied by way of the cable 22, a further junction box (not shown) and the cable 24 to the ten input terminals 30 respectively of the ten switch devices in the group 77 in the incoming unit 10.

The incoming unit operates in the manner already described to render one switch device in the group 76 and one in the group 77 operative in response to the first pulse appearing at the terminal 35 indicating a free channel in the selected junction. It is arranged that pulses of 8,000 p. p. s. derived from the output of the generator 14' and in the channel identified by the incoming unit are applied to the suppressor grid of the valve 36 and are modulated by the voltages applied from the input terminal 11 to the control grid of the valve 36.

In order to achieve this, each of the switch devices in the groups 76 and 77 may be as shown in Figure 18. In this figure the input terminal 30 is connected to the control grid of the gas-filled triode 49, and the input terminal 31 is connected to the cathode of the diode 57 whose anode is connected to the control grid of the valve 49. This simple arrangement can be used in view of the fact that the low frequency pulses used for channel identification can be made substantially broader than 20 micro-seconds. The pulses applied to the terminals 30 and 31 are arranged to be positive-going and it will be appreciated that when a pulse appears at the terminal 30 in the absence of a pulse at the terminal 31 the diode 57 provides substantially a short-circuit and the valve 49 does not strike. When, however, a pulse appears at the terminal 31 from the lock circuit it renders the diode 57 non-conducting and allows the valve 49 to be struck by a pulse occurring simultaneously at the terminal 30.

Referring again to Figure 17, the ten trains of high frequency D pulses appearing at the ten output terminals 75' respectively of the generator 14', are applied by way of a ten core cable 22', a junction box (not shown) and a further ten core cable 24' to ten input terminals 30' of the group 76 of ten switch devices respectively. Similarly the ten trains of U pulses appearing at the ten output terminals 74' of the generator 14' are applied by way of a ten-core cable 22, a junction box (not shown) and a ten-core cable 24, to ten input terminals 30' of the group 77 of ten switch devices respectively.

The terminal 30' is shown in Figure 18 to be connected through a capacitor 185 to the anode of the valve 49 and hence, when this valve is struck, the pulses applied to the terminal 30' appear at the output terminal 32.

It is arranged that correspondingly numbered high frequency and low frequency pulses are applied to the input terminals 30' and 30 respectively of each unit. For example if the $D_6$ high frequency pulses are applied to the terminal 30', $D_6$ low-frequency pulses are applied to the terminal 30. The high frequency D and U pulses appearing at the output terminals 31 of the two groups 76 and 77 of switch devices are combined as previously described by means of the rectifiers 79 and 81 and the resister 80 to provide the high frequency pulses in the identified channel at the suppressor grid of the valve 36.

These high frequency pulses are applied, by way of the moving contact 179 and fixed contact No. 6 of the bank 176 of the uni-selector 175, to the pulse amplifier 182 common to junction No. 6. The output of this amplifier is connected to the 100 terminating units of that junction.

Each terminating unit comprises a selector and demodulator 186 as shown in the drawing, which serves to select the pulses appearing in the channel number of that terminating unit only, to demodulate the pulses and apply the demodulated intelligence to the outgoing or Go line in that channel. The selector and demodulators may, for example, be as shown in Figure 19, in which the output of the amplifier 182, of Figure 18 is applied through a resistor 187 to the control grid of a triode valve 188. A diode 189 has its anode connected to the control grid of the triode 188 and provides substantially a short circuit to pulses applied to the central grid through the resistor 187 in the absence of a positive-going pulse on the cathode of the diode 189. It is arranged that high frequency pulses in the channel number of the terminating unit are applied to the cathode of the diode 189 and hence pulses in this channel reach the anode of the valve 188. These are passed through a low-pass filter 190 to the terminal $T_{623}$ Go.

The pulses applied to the cathode of the diode 189 may be derived as shown in Figure 17 by means of a diode 191 and resistor 192. The D and U high frequency pulses appropriate to the channel are applied to the terminals 193 and 194. For example the pulses for the terminating unit No. 623 shown are $D_2$ and $U_3$ respectively and are arranged to be positive-going.

The terminating unit also contains a pulse gate arranged to open as soon as pulses are passed to the terminal $T_{623}$ Go. The low frequency D and U pulses appropriate to the channel number of the terminating unit, that is to say $D_2$ and $U_3$ in this example, are applied to terminals 196 and 197 respectively and are arranged to be positive-going. The terminal 196 is connected through a resistor 198 to the input of the gate 195 and the terminal 197 is connected to the cathode of a diode 199 whose anode is connected to the input of the gate 195. It follows therefore, that the $U_3$ pulses occurring during the $D_2$ pulses are the only ones to pass into the gate.

The gate may be arranged as shown in Figure 20 in which a gas-filled triode 200 has its control grid supplied with striking voltage from a rectifier 201 adapted to rectify voltage appearing at the terminal $T_{623}$ Go. The pulses appearing at the anode of the diode 199 are applied through a capacitor 202 to the anode of the valve 200 and as the cathode lead of this valve contains a load resistor 203, the pulses applied to the anode of the valve 200 appear at the cathode thereof and are applied thence to the interrogating circuit 16.

The Return line of the channel associated with the terminating unit is connected to a modulator 204 as shown. High frequency pulses in the channel associated with the terminating unit (channel No. 23 in this example) are applied to the modulator and are modulated by the speech transmitted to the terminating unit over the Return line. These pulses may conveniently be obtained from the anode of the diode 191, and the modulator may be as shown in Figure 21. It will be seen in Figure 21 that the speech received from the Return line is applied to the control grid of a pentode valve 205 and the high frequency pulses in channel No. 23 are applied to the suppressor grid of the pentode 205. The amplitude-modulated pulses appearing at the anode of the pentode 205 are applied to the common pulse amplifier 183 for junction No. 6.

The output of the common pulse amplifier 183 is applied to fixed contact No. 6 of the bank 178 of the uniselector 175 and thence by way of the moving contact 181 to the control grid of a pentode valve 206. The suppressor grid of the pentode 206 is connected to the suppressor grid of the pentode 36 and hence gating pulses in channel 23 are applied to the suppressor grid of the pentode 206 and the pulses of this channel, and no other, modulated by the return speech appear at the anode of the valve 206. Demodulation is effected by means of a low-pass filter 207 connected between the anode of the pentode 206 and the return speech terminal 11' in the incoming unit 10.

It can of course be arranged that the pulses at the output of the amplifier 182 are broadened before being applied to the terminating units. One suitable arrangement for effecting this is shown in Figure 22. The output of the amplifier 182 is fed through ten resistors 208 to 217 to the anodes of ten diodes 218 to 227 respectively. These diodes are arranged to provide substantially short circuits except when positive-going pulses are applied to their cathodes. It is arranged that the high frequency pulses $U_1$ to $U_9$ and $U_0$ are applied to the cathodes of the diodes 218 to 217 respectively in the positive sense. The only high-frequency channel pulses which can pass the diodes are, therefore, those which coincide with the U pulses applied to the cathodes of the diodes. Each diode allows, therefore, pulses in ten channels to pass.

The pulses which coincide with the $U_1$ pulses are passed by the diode 218 through a further diode 228 and charge a capacitor 229. A diode 230 is connected in shunt with the capacitor and is arranged to be non-conducting except when a negative-going pulse is applied to its cathode. Negative-going, high frequency $U_0$ pulses are applied to the cathode of the diode 230 and cause the capacitor 229 to be discharged. Each pulse passed by the diode 218 is broadened therefore until the instant of occurrence of the next succeeding high-frequency $U_0$ pulse. These broad pulses are applied to ten output terminals which are connected to the ten terminating units whose channel numbers end with the digit 1, as shown in the drawing.

The diodes 219 and 220 allow pulses coinciding with the high frequency $U_2$ and $U_3$ pulses respectively to pass. Broadening is effected in the same way as described in the last preceding paragraph, the broadened pulses passed by the diodes 219 being applied to ten output terminals connected to the ten terminating units whose channel numbers end with the digit 2, and those passed by the diode 220 being applied to ten output terminals connected to the ten terminating units whose channel numbers end with the digit 3.

The pulses passed by the diodes 221 to 227 are delayed until the instant of occurrence of the next succeeding $U_1$ pulse and are then broadened until the instant of occurrence of the $U_0$ pulse following the last said $U_1$ pulse. For example, the pulses passed by the diode 221 are applied through a delay line 231 and a diode 232 to charge a capacitor 233, the delay line 231 being arranged to delay the pulses applied thereto until the instant of occurrence of the next succeeding $U_1$ pulse. The capacitor 233 holds the charge until the occurrence of the next $U_0$ pulse which is applied to the cathode of a diode 234 and renders this diode conducting to discharge the capacitor 233. The broadened pulses appearing across the capacitor 233 are applied to ten output terminals which are connected to the ten terminating units whose channel numbers end with the digit 4.

The pulses passed by the diodes 222 to 227 are delayed and broadened in like manner to those passed by the diode 221, and are applied to separate groups each of ten terminals connected respectively to the terminating units whose channel numbers end with the digits corresponding to the subscripts of the U pulses applied to the diodes 222 to 227 respectively, as shown.

When broadened pulses are used as just described, the appropriate D pulse is applied to the cathode of the diode 189 of Figure 19 (which shows one example of the selector and demodulator 186 of Figure 17) instead of the appropriate channel pulse as previously described. For example, in order to select pulses in channel 1 which appear across the capacitor 229 in Figure 22, $D_0$ pulses are applied to the cathode of the diode 189 of Figure 19. In selecting pulses passed by the diodes 221 to 227 of Figure 22, it is necessary of course to apply a D pulse to the cathode of the diode 189 of Figure 19 having a subscript next succeeding the first digit of the channel number of the terminating unit. For example, assuming that pulses in channel No. 54 are to be selected then $D_6$ pulses are applied to the cathode of the diode 189.

It will be understood that as pulses of relatively low recurrence frequency can be used in the arrangement of Figure 17 to identify the several channels, the lock circuit need not contain a blocking oscillator as shown in Figure 4, the pulses themselves having sufficient energy for operating the switch devices in the control unit. The lock circuit may then be simplified for example as shown in Figure 23. In this figure the terminal 35 is connected to the anode of the gas-filled triode valve 59 and the relay contacts 13 are connected between the control grid of the valve 59 and earth as in Figure 4.

When the relay contacts 13 are closed the valve 59 strikes and the next pulse appearing at the terminal 35 appears at the cathode of the valve 59 and is transmitted by way of a capacitor 235, resistor 236 and further capacitor 237 to the output terminal 33. The pulse appearing at the cathode of the valve 59 is also passed through a resistor 238 and diode 239 to charge a capacitor 240. The time constant of charge of the capacitor 240 is arranged to be such that the capacitor 240 becomes fully charged just before the end of the pulse appearing at the cathode of the valve 59. The capacitor 240 is connected between the control grid and cathode of a second gas-filled triode valve 241 and when the capacitor 240 is fully charged it is arranged that the voltage across this capacitor is sufficient to cause the valve 241 to strike.

A diode 242 has its anode connected through a resistor 243 to the positive terminal 244 of a source (not shown) of H. T. whose negative terminal is earthed, it being arranged that the terminal 244 is less positive than the H. T. terminal 245 to which the anode of the valve 241 is connected, but is more positive than the anode of the valve 241 when this valve is struck. When the valve 241 strikes substantially a short circuit is provided from the anode of the diode 242 through the diode 242 and the valve 241 to earth. As the valve 241 strikes just before the end of the first pulse appearing at the cathode of the valve 59, this is the only pulse which gets through to the output terminal 33, subsequent pulses being short-circuited to earth.

The contacts 62 serve to extinguish the two valves 59 and 241 at the end of the call as described with reference to Figure 4.

In the arrangements hereinbefore described, with the exception of Figure 1, the pulses have been generated in accordance with the decimal system. Other systems may of course be used. For example, where there are 64 channels to be dealt with the group of switch devices 76 and 77 may each contain eight switch devices instead of ten as already described. The pulses may then be generated in two groups each of eight trains, the trains in one of the groups being eight times the frequency of those in the other group.

If desired the binary system may of course be used. For example Figure 24 is a circuit diagram of a control circuit suitable for use with 32 channels and adapted for use with pulses generated in accordance with the binary system. In this arrangement there are five groups 276 to 280 of switch devices, each group having two switch devices. The form of the pulses applied to the input terminals 30 of the ten switch devices is as shown in Figures 25(*a*) to (*e*) the pulses applied to the ten switch terminals 30 being shown alongside these terminals respectively. The voltages applied to the terminals 30 of each group are of the same frequency but in anti-phase, and the frequencies of the pulses applied to the five groups being related as shown, those applied to the group 277 being twice those applied to the group 276, those applied to the group 278 being twice those applied to the group 277 and so on.

The pulse passed by the lock circuit 34 is of a duration equal to any one of the pulses as shown in Figure 25 (*e*) and hence only one switch device in each of the groups is made operative thereby. For example, if the pulse passed by the lock circuit occurs at the time shown by the single pulse in Figure 25 (*f*) the upper switch device in the group 276, the lower switch devices in the remaining groups are made operative. The pulses $B_1$ of Figure 25 (*a*) appear at the output terminal 32 of the group 276. These pulses are applied through a resistor 281 to one plate of a rectifier 282 the other plate being connected to the output terminal 32 of the group 277. This rectifier is arranged to provide substantially a short-circuit except when a positive-going pulse appears at the terminal 32 of the group 277. The pulses $B'_2$ of Figure 25 (*b*) appear at the terminal 32 of the group 277 and hence only that part of the positive pulse $B_1$ coinciding with the positive pulses $B'_2$ are allowed to pass. This process is repeated for the several groups. The pulse finally appearing at the suppressor grid of the valve 36, is therefore, the $B'_{16}$ pulse which coincides with a $B'_8$, a $B'_4$, a $B'_2$ and a $B_1$ pulse, and is the pulse 284 in Figure 25(*e*).

It will be understood that the switch devices shown in Figure 24 may be as shown in Figure 18 and that high frequency binary pulses for carrying speech may be applied to the input terminals 30' of the switch devices. The frequencies of these high frequency pulses must be related in the same way as those shown in Figure 25(*a*) to (*e*).

In the arrangements so far described the channel identifying voltages are pulses characterised by their instants of occurrence. Voltages characterised in other ways may be used. For example Figure 26 is a block schematic diagram of a simple arrangement in which the channel identifying voltages are oscillations of different frequencies.

In the simple arrangement shown in Figure 26 it is assumed that there are five lines terminated at the terminals $T_1$ to $T_5$ respectively as in Figure 1. The generator 14 is arranged to generate five oscillations of different frequencies which appear at the output terminals 17 to 21 respectively. These oscillations are applied to the interrogating circuit 16 and to the input terminals 30 of the five switch devices 25 to 29 respectively in the incoming unit 10. In the interrogating circuit 16, the five oscillations are applied to the input terminals of five gates 285 to 289 respectively. These gates are arranged to be open when the lines $T_1$ to $T_5$ are not engaged and hence the applied oscillations pass through the gates. The output terminals of the five gates are connected to the five fixed contacts 290 to 294 respectively of a switch device 295. The moving contact 296 of the switch device 295 is arranged to rotate over the fixed contacts 290 to 294 continuously and hence to connect the outputs of the gates 285 to 289 in succession to the output terminal 35 of the interrogating circuit. The voltages appearing at the terminal 35 are therefore bursts of oscillation of different frequencies. The first burst appearing at the terminal 35 after the contacts 13 are closed operates the lock circuit which passes this burst to the input terminals 31 of the five switch devices in the control circuit and allows no further oscillation to pass.

Five band-pass filters 296 to 300 are connected between the input terminals 31 and the switch devices 25 to 29 respectively. These band-pass filters are arranged to pass oscillations of the frequencies of the five generated oscillations respectively and no others. The burst passed by the lock circuit is passed, therefore, to only that one of the switch devices 25 to 29 to whose input terminal 30 is applied the oscillation of the same frequency. This switch device is arranged to operate and the oscillation applied to its input terminal 30 appears at its output terminal 32 and is applied thence to the control grid of the pentode valve 36. The terminal 11 is connected to the suppressor grid of the valve 36 and hence signals applied to the terminal 11 amplitude moderate the oscillation applied to the control grid.

The amplitude-modulated oscillations are applied by way of the terminal 37 and amplifier 38 to five band-pass filters 301 to 305 whose outputs are applied to the terminals $T_1$ to $T_5$. Each of these filters is arranged to pass only one of the modulated carriers, the five filters passing different ones respectively.

The output of the amplifier 38 is also applied through the limiter 47 to the interrogating circuit 16. In the interrogating circuit the output from the limiter 47 is passed to five band-pass filters 306 to 310, arranged to have the same pass-bands as the filters 301 to 305 respectively. The outputs of the filters 306 to 310 are applied to close the gates 285 to 289 respectively. It will be seen therefore that as soon as an oscillation appears at the terminal 37, the bursts of oscillation of that frequency are cancelled from the output of the interrogating circuit.

The gates 285 to 289 may be as shown in Figure 27 which is a circuit diagram of the gate 285 of Figure 26. The terminal 17 of the generator 14 is connected to the control grid of a pentode valve 311, and the output of the filter 306 is applied to produce a negative bias by means of a rectifier 312, a capacitor 313 and a leak resistor 314. This negative bias is applied to the suppressor grid of the pentode 311 and is arranged to be of sufficient amplitude to cut off the anode current of the pentode 311.

In the absence of output from the filter 306 the oscillation applied to the control grid of the pentode 311 is reproduced at the anode thereof and is applied through a capacitor 315 to the fixed contact 290 of the switch device 295. When however an oscillation appears at the output of the filter 306 the anode current of the pentode 311 is cut-off and the oscillation applied to the control grid is no longer reproduced at the anode.

The lock circuit may conveniently be as shown in Figure 23. The first burst of oscillation appearing at the cathode of the valve 59 of Figure 23 is passed through the capacitor 235, the resistor 236 and the capacitor 237 to the output terminal 33. This burst is also applied, however, to the rectifier 239 and positive half cycles passed by the rectifier 239 charge the capacitor 240. It is arranged that towards the end of the burst the voltage across the capacitor 240 is sufficient to cause the valve 241 to strike. This valve then functions with the diode 242 to prevent any further voltage from being transmitted to the output terminal 33 as previously described.

The switch devices 25 to 29 may be as shown in Figure 28 which is a theoretical circuit diagram of the switch device 25. It will be seen that the output of the filter 296 is rectified by a diode rectifier 316 and applied to charge a capacitor 317 provided with a leak resistor 318. When, therefore, a burst of oscillation at a frequency within the passband of the filter is applied from the lock circuit to the terminal 30, the capacitor 317 becomes charged with its upper plate positive. It is arranged that the voltage developed across the capacitor 317 is of sufficient magnitude to strike the valve 49. The input terminal 30 is connected through the capacitor 50 to the anode of the valve 49 and hence the oscillation applied to the terminal 30 appears at the output terminal 32 when the valve 49 is struck. It will be seen that in this example the oscillation applied to the terminal 30 plays no part in striking the valve 49, and serves merely as an input terminal for applying to the anode of the valve the oscillation in the same channel as the burst passed by the filter 296. If the valve 49 is required to provide only a direct voltage at the terminal 32 for controlling a mechanical selector switch such as 83 in Figure 5, the terminal 30 and capacitor 50 may, of course, be dispensed with.

I claim:

1. A multi-channel communication system including a first signalling station, a second signalling station, a plurality of communication channels extending between said stations, and apparatus at said first station for identifying all free ones of said channels, said apparatus comprising a generator continuously producing a plurality of pulsating voltages of different characteristics, each voltage identifying a different one of said communication channels, an electrically-controllable cancelling circuit, means to apply said voltages to said cancelling circuit, means connecting said cancelling circuit to all the communication channels in the system, and means connected to all the communication channels in said system to provide a first voltage condition in each communication channel when the channel is free and to provide a second voltage condition in each communication channel when the channel is engaged, said cancelling circuit including means responsive to said second voltage conditions in different engaged ones of the said communication channels to cancel different voltages respectively from the output of said cancelling circuit whereby free ones of the said communication channels are identified by the characteristics of the voltages appearing at the output of said cancelling circuit.

2. Apparatus as claimed in claim 1, wherein said second voltage condition is a train of pulses, the pulses in different channels being of different phases, and the first voltage condition is the absence of pulses.

3. Apparatus as claimed in claim 1, wherein said second voltage condition is an oscillation, the oscillations in different channels being of different frequencies and the said first voltage condition is the absence of said oscillations.

4. A multi-channel communication system including a first signalling station, a second signalling station, a plurality of communication channels extending between said stations, and apparatus at said first station for identifying all free ones of said channels, said apparatus comprising a generator continuously producing a plurality of voltages of different characteristics, each voltage identifying a different one of said communication channels, an electrically-controllable cancelling circuit, means to apply said voltages to said cancelling circuit, means connecting said cancelling circuit to all the communication channels in the said system, means connected to all the communication channels to provide a first voltage condition in each communication channel when the channel is free and to provide a second voltage condition in each communication channel when the channel is engaged, said cancelling circuit including means responsive to said second voltage conditions in different engaged ones of the several communication channels to cancel different voltages respectively from the output of said cancelling circuit, whereby free ones of the said communication channels are identified by the characteristics of the voltages appearing at the output of said cancelling circuit, a gate device, means to apply the voltages uncancelled by said cancelling circuit to said gate device, said gate device comprising means responsive to the application of any one of the said uncancelled voltages from the said cancelling circuit to close the gate device against any further voltages applied thereto from said cancelling circuit, a group of gas-filled electron discharge devices, means to apply said one voltage from said gate device to said discharge devices, and means connected to said discharge devices to render different ones thereof responsive to different ones of said voltages.

5. Apparatus as claimed in claim 4, wherein said voltages are pulses of different phases.

6. Apparatus as claimed in claim 5, wherein said second voltage condition is a train of pulses, pulses in different channels being of different phases, and the first voltage condition is the absence of pulses.

7. Apparatus as claimed in claim 4, wherein said voltages are oscillations of different frequencies.

8. A multi-channel communication system including a first signalling station, a second signalling station, a plurality of communication channels extending between said stations, and apparatus at said first station for identifying all free ones of said channels, said apparatus comprising a generator continuously producing a plurality of pulse trains of different phases equal to the number of communication channels in the system, each pulse train identifying a different one of said communication channels, an electrically-controllable cancelling circuit, means to apply said pulses trains to said cancelling circuit, an output terminal for said cancelling circuit, a gate device, a connection from said output terminal of the cancelling circuit to the input terminal of said gate device, a number of gas-filled electron discharge switches equal to the number of communication channels in the system, each of said discharge switches having two control terminals and being responsive to voltages appearing simultaneously at said control terminals to strike, a connection from the output of said gate device to a first of said control terminals in all said discharge switches, connections to apply said pulse trains to the second input terminals of said discharge switches respectively, a common output terminal for said discharge device, and a connection from said common output terminal to said cancelling circuit, said gate device comprising means responsive to any one of the pulses in said pulse trains applied thereto from said cancelling circuit to close the gate device against any further pulses from said cancelling circuit, whereby only one pulse passes through the gate device and the one of said discharge switches is struck to which the pulse train of corresponding phase is applied at said second control terminal, and the cancelling circuit comprises means responsive to the last said pulse train applied thereto from said common output terminal to cancel from the output of the cancelling circuit the pulse train of like phase applied to the cancelling circuit from said generating means, whereby free ones of said communication channels are identified by the pulse trains appearing at the output of the said cancelling circuit.

9. A multi-channel communication system including a first signalling station, a second signalling station, *m* communication channels extending between said station and apparatus at said first station for identifying all free ones of said channels, said apparatus comprising generators continuously producing two groups of pulse trains, a first of the groups containing *a* pulse trains, the second containing $m/a$ pulse trains where *a* is an integer greater than unity and the repetition period of the pulses in the trains of the second group being *a* times that of the pulses in the trains of the first group, each combination of a pulse train from the first group and a pulse train from the second group identifying a different one of said communication channels, an electrically-controllable cancelling circuit, means to apply said pulse trains to said cancelling circuit, a gate device, means to apply the output of said cancelling circuit to said gate device, two groups of gas discharge switches, a first of said groups of gas discharge switches comprising *a* gas discharge switches and the second of said groups of gas discharge switches comprising $m/a$ discharge switches, each of said discharge switches comprising first and second control terminals, connections to apply the first group of pulse trains to the first control terminals of the discharge switches respectively in the first group of discharge switches, connections to apply the second group of pulse trains to the first control terminals of the discharge switches respectively in the second group of discharge switches, means to apply the output of said gate device to the second control terminals of all said discharge switches, and means connecting the several communication channels in the system to said cancelling circuit, the cancelling circuit comprising means responsive to engaged conditions in different communication channels of the system to cancel different pairs of said pulse trains respectively, each pair including a pulse train from each group of pulse trains, and means to combine the pulses of uncancelled pairs to provide output pulse trains for application to said gate device, each output pulse train being in the form of those pulses in the pair which are uncancelled from the first group and occurring during the uncancelled pulses from the second group, whereby free ones of the said communication channels are identified by the pulse trains appearing at the output of the said cancelling circuit, and said gate circuit comprising means responsive to any one of said output pulses to prevent the transmission of any further output pulses to the second terminals of said gas discharge switches.

10. Apparatus according to claim 9 and comprising means to provide two further groups of pulse trains, a first group of the further pulse trains comprising $a$ trains and the second group of further pulse trains comprising $m/a$ trains, the trains in the last said two groups of pulse trains being of relatively high frequency and the trains in the first said groups of trains being of relatively low frequency, connections to apply the first group of further pulse trains to input terminals of the discharge switches, and connections to apply the second group of further pulse trains to input terminals of the discharge switches respectively of the second group of discharge switches.

11. Apparatus according to claim 10, wherein said cancelling circuit comprises a plurality of further gate devices, said means connecting all the communication channels to said cancelling circuit serving to connect all the communication channels to all the further gate devices, and said means for applying the first said two groups of pulse trains to said cancelling circuit comprising means to apply the last said pulse trains in pairs to the further gate devices, each pair comprising a pulse train from each of the two first said groups, different pairs being applied to the different further gate devices.

12. A multi-channel communication system including a first signalling station, a second signalling station, a plurality of communication channels extending between said stations, and apparatus at said first station for identifying all free ones of said channels, said apparatus comprising a generator continuously producing a plurality of pulses of different phases, each pulse identifying a different one of said communication channels, an electrically-controllable cancelling circuit, means to apply all said pulses to said cancelling circuit, means connecting said cancelling circuit to all the communication channels in the system and means connected to all the communication channels in said system to provide a first voltage condition in each communication channel when the channel is free and to provide a second voltage condition in each communication channel when the channel is engaged, said cancelling circuit including means responsive to said second voltage conditions in different engaged ones of said communication channels to cancel different voltages respectively from the output of said cancelling circuit whereby free ones of the said communication channels are identified by the phases of pulses appearing at the output of said cancelling circuit.

13. A multi-channel communication system including a first signalling station, a second signalling station, a plurality of communication channels extending between said stations, and apparatus at said first station for identifying all free ones of said channels, said apparatus comprising a generator continuously producing a plurality of oscillations of different frequencies, each oscillation identifying a different one of said communication channels, an electrically-controllable cancelling circuit, means to apply all said oscillations to said cancelling circuit, means connecting said cancelling circuit to all the communication channels in the system and means connected to all the communication channels in the system to provide a first voltage condition in each communication channel when the channel is free and to provide a second voltage condition in each channel when the communication channel is engaged, said cancelling circuit including means responsive to said second voltage conditions in different engaged ones of said communication channels to cancel different oscillations respectively from the output of said cancelling circuit whereby free ones of the said communication channels are identified by the frequencies of oscillations appearing at the output of said cancelling circuit.

14. In a multi-channel communication system the provision of apparatus for making a connection between a signal voltage input terminal and a free one of the communication channels in the system, the apparatus comprising means providing a control voltage having a characteristic identifying a free communication channel, a modulator, a connection from the signal voltage terminal to the modulator, a source providing a plurality of different carrier voltages for transmission in different ones of the said communication channels, an electrically operable switch connected between said source and said modulator to select different carrier voltages for application to said modulator, and means for applying said control voltage to operate said electrically operable switch device.

References Cited in the file of this patent

UNITED STATES PATENTS

| | | |
|---|---|---|
| 2,387,018 | Hartley | Oct. 16, 1945 |
| 2,395,467 | Deloraine | Feb. 26, 1946 |
| 2,418,145 | Taylor | Apr. 1, 1947 |
| 2,490,833 | Ransom | Dec. 13, 1949 |
| 2,492,136 | Deloraine | Dec. 27, 1949 |
| 2,506,612 | Ransom | May 9, 1950 |
| 2,520,170 | Ransom | Aug. 29, 1950 |
| 2,541,932 | Melhose | Feb. 13, 1951 |
| 2,553,605 | Ransom | May 22, 1951 |
| 2,559,603 | Derjavitch | July 10, 1951 |
| 2,563,589 | Den Hertog | Aug. 7, 1951 |
| 2,583,711 | Scowen | Jan. 29, 1952 |